(12) United States Patent
Van Osten et al.

(10) Patent No.: US 8,803,908 B2
(45) Date of Patent: Aug. 12, 2014

(54) DIGITAL IMAGE TRANSITIONS

(75) Inventors: Robert Michael Van Osten, Campbell, CA (US); Craig Dehner, Cincinnati, OH (US); Guillaume Vergnaud, Tokyo-to (JP)

(73) Assignee: Apple Inc., Cupertino, CA (US)

( * ) Notice: Subject to any disclaimer, the term of this patent is extended or adjusted under 35 U.S.C. 154(b) by 1083 days.

(21) Appl. No.: 12/688,821

(22) Filed: Jan. 15, 2010

(65) Prior Publication Data

US 2011/0176720 A1 Jul. 21, 2011

(51) Int. Cl.
G09G 5/00 (2006.01)

(52) U.S. Cl.
USPC ............ 345/619; 345/629; 345/473; 715/730

(58) Field of Classification Search
USPC ................. 345/419, 619, 173, 635, 473, 629; 715/730, 744, 810, 838, 781, 783, 863, 715/854, 731
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,644,364 B2 * | 1/2010 | Patten et al. | 715/835 |
| 7,663,607 B2 | 2/2010 | Hotelling et al. | |
| 8,296,656 B2 * | 10/2012 | Dowdy et al. | 715/727 |
| 8,479,122 B2 | 7/2013 | Hotelling et al. | |
| 2006/0026521 A1 | 2/2006 | Hotelling et al. | |
| 2006/0107229 A1 * | 5/2006 | Matthews et al. | 715/782 |
| 2006/0197753 A1 | 9/2006 | Hotelling | |
| 2006/0274060 A1 * | 12/2006 | Ni et al. | 345/419 |
| 2007/0050718 A1 * | 3/2007 | Moore et al. | 715/744 |
| 2007/0162953 A1 * | 7/2007 | Bolliger et al. | 715/838 |
| 2007/0180376 A1 | 8/2007 | McCall et al. | |

(Continued)

FOREIGN PATENT DOCUMENTS

| | | | |
|---|---|---|---|
| JP | 2000-163031 A | 6/2000 | |
| JP | 2002-342033 A | 11/2002 | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

Primary Examiner — Chante Harrison
(74) Attorney, Agent, or Firm — Morrison & Foerster LLP

(57) ABSTRACT

Among other things, methods, systems and computer program products are disclosed for displaying a sequence of multiple images to provide an appearance of a three-dimensional (3D) effect. A data processing device or system can identify multiple images to be displayed. The data processing device or system can divide a two-dimensional (2D) display area into multiple display portions. The data processing device or system can display a sequence of the identified images on the display portions so as to provide an appearance of a three-dimensional (3D) effect.

16 Claims, 37 Drawing Sheets

(56) References Cited

U.S. PATENT DOCUMENTS

| | | | |
|---|---|---|---|
| 2007/0192728 A1* | 8/2007 | Finley et al. | 715/781 |
| 2007/0245250 A1* | 10/2007 | Schechter et al. | 715/760 |
| 2008/0066016 A1* | 3/2008 | Dowdy et al. | 715/854 |
| 2008/0195971 A1* | 8/2008 | Jung et al. | 715/810 |
| 2009/0002335 A1* | 1/2009 | Chaudhri | 345/173 |
| 2009/0113307 A1 | 4/2009 | MacKenzie | |
| 2009/0119596 A1 | 5/2009 | Iwahara et al. | |
| 2009/0141123 A1* | 6/2009 | Conley | 345/419 |
| 2009/0172532 A1* | 7/2009 | Chaudhri | 715/863 |
| 2009/0198359 A1* | 8/2009 | Chaudhri | 345/173 |
| 2010/0073396 A1* | 3/2010 | Wang et al. | 345/619 |
| 2010/0088605 A1* | 4/2010 | Livshin et al. | 715/731 |
| 2011/0107223 A1* | 5/2011 | Tilton et al. | 715/730 |
| 2011/0122129 A1* | 5/2011 | Anthony et al. | 345/419 |
| 2011/0145753 A1* | 6/2011 | Prakash | 715/783 |
| 2011/0148901 A1* | 6/2011 | Adams et al. | 345/589 |
| 2011/0148932 A1* | 6/2011 | Niemi et al. | 345/473 |
| 2012/0050788 A1* | 3/2012 | Bachman et al. | 345/635 |
| 2012/0137223 A1* | 5/2012 | Nicol et al. | 715/730 |

OTHER PUBLICATIONS

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

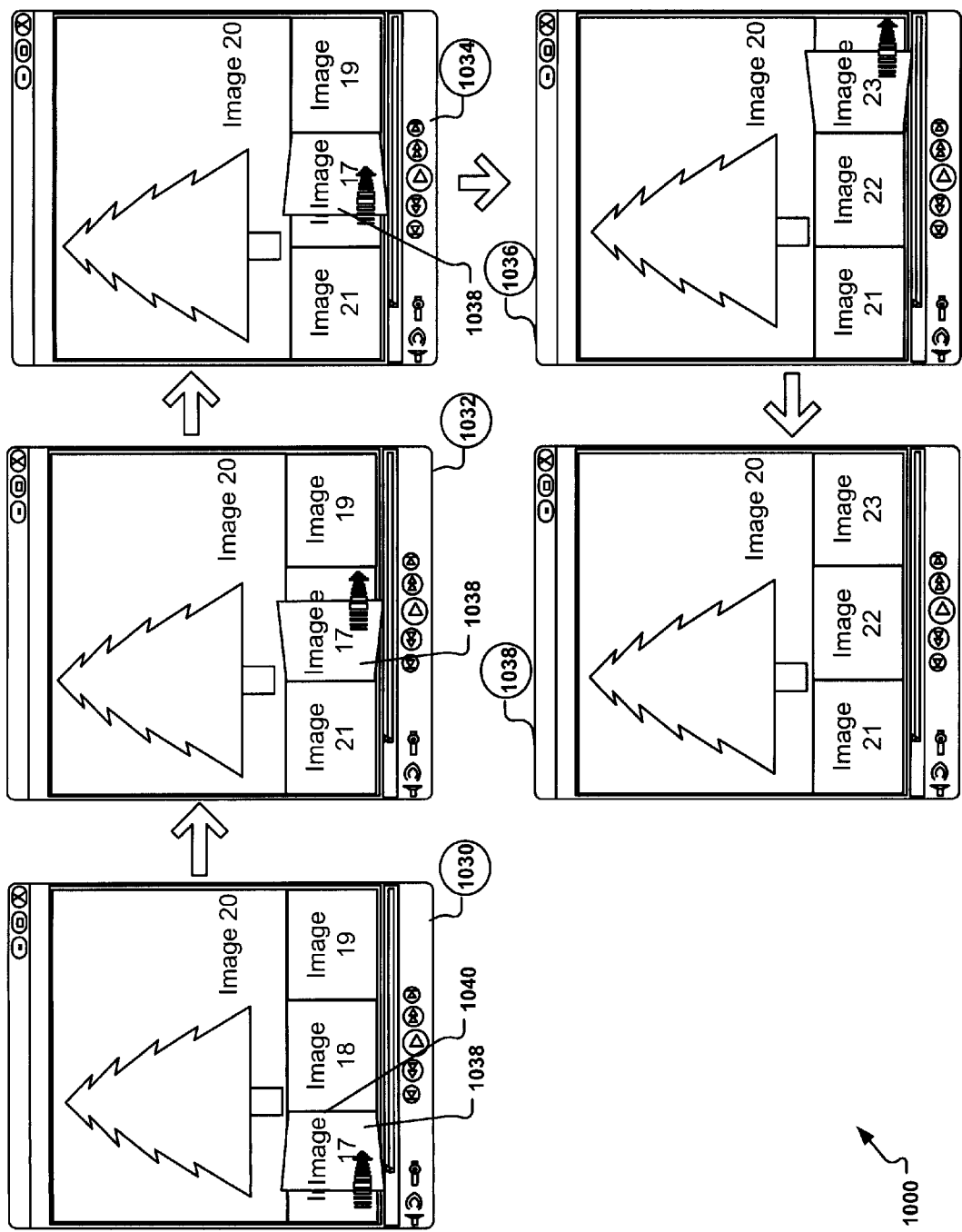

DIGITAL IMAGE TRANSITIONS

BACKGROUND

This application relates to displaying images, for example, techniques for transitioning from the display of one image to another.

A slideshow is a popular format for presenting a collection of images alone or in conjunction with other information, such as text or audio. Slideshows have been used for a wide variety of purposes, including instruction, marketing, and entertainment. In some instances, the slideshow images are arranged sequentially or in accordance with image content to tell a story. Further, the pace of a slideshow can be controlled, whether the slides are advanced manually or automatically. For example, timing information can be associated with the slideshow to indicate when each slide is to be displayed.

Previously, slideshows have been implemented using projectors and slide carousels. More recently, media presentation applications have been developed to assist users with slideshow development and customization for computer-based implementations. The applications can include templates that provide either or both of graphical material, e.g. theme elements, and structural material, e.g. timing information and transitions. Theme elements can be used to customize slide appearance, including color schemes and slide layout. Further, preset timings and transitions can be used to advance the slideshow from one slide to the next. In some implementations, the preset timings and transitions can be modified for one or more slides to control the amount of time a particular slide is displayed or the manner in which one slide replaces another in the show.

Once a computer-based slideshow has been generated, the information associated with the slideshow, e.g. images and configuration data, can be stored to permit future retrieval. For instance, a generated slideshow can be stored on a Compact Disc (CD) or Digital Versatile Disc (DVD) as a presentation and accessed for playback on any compatible device. A slideshow also can be stored in an executable file, including in a streaming format, such that it can be accessed locally or over a communications network. Additionally, one or more rights management protections can be associated with a slideshow, such as to require a password to access the slideshow, to limit the period over which the slideshow can be accessed, or to limit one or more functions associated with the slideshow, including editing and printing slides.

SUMMARY

Methods, systems and computer program products are described for displaying images in a two-dimensional plane of a display device so as to present an appearance of transitioning among images in a three-dimensional ("3D") space.

In one aspect, a method performed by software executing on a data processing device includes identifying, at the data processing device, images to be displayed; dividing, at the data processing device, a two-dimensional (2D) display area into display portions; and displaying, at the data processing device, a sequence of the identified images on the display portions so as to provide an appearance of a three-dimensional (3D) effect.

Implementations can optionally include one or more of the following features. Displaying the identified images can include manipulating the display portions to cause at least one of the identified images to appear to move in 3D space. The display portions on the 2D display area can be arranged based on a display layout. The display layout can be selected based on at least one image characteristic of the identified images. The at least one image characteristic can include at least one of aspect ratio or a face or a person on a given image. The appearance of a three-dimensional (3D) effect can include at least one of a fold, a flip or a petal fold applied to one of the identified images. Displaying a sequence of the identified images can include displaying a first sequence of a first subset of the identified images followed by a second sequence of a second subset of the identified images on the display portions so as to provide an appearance of a three-dimensional (3D) effect. Additionally, the method can include displaying a transition between the first subset and the second subset.

In another aspect, a method performed by software executing on a data processing device can include receiving images to be displayed; associating, at the data processing device, a subset of the received images with display portions on a display area; and displaying, at the data processing device, the subset of the received images on the associated display portions to provide an appearance of a three-dimensional (3D) effect. Displaying can include manipulating the associated display portions to mask at least one image from the subset with at least one other image from the subset. Displaying the subset of the received images can include manipulating the associated display portions to move a given image from the subset from one display portion to another to reveal a previously undisplayed image from the subset.

In yet another aspect, a system includes an image analyzer to receive images from a user. Also, the image analyzer is configured to organize the received images into groups, with each group including at least one image. Moreover, the image analyzer can detect at least one image characteristic of each image in a given one of the groups. The system can include an image associating unit in communication with the image analyzer to identify a layout for displaying the images in the given group on a display area based on the detected at least one image characteristic, and arrange the images in the given group to fit the identified layout. The system includes a display unit to display the arranged images in the given group using the identified layout to present an appearance of a three-dimensional (3D) effect.

Implementations can optionally include one or more features. The at least one image characteristic can include an aspect ratio of each image. The image analyzer can be configured to detect at least one image characteristic of each image in another one of the groups. The image associating unit can be configured to identify a layout for the other group and arrange the images in the other group to fit the layout identified for the other group. The display unit can be configured to display the arranged images in the other group using the layout identified for the other group. The image associating unit can be further configured to identify a transition to be displayed between displaying the two groups, wherein the identified transition provides an appearance of a 3D effect. The identified transition can include manipulating the display area to replace the one group of images with the other group of images a portion at a time.

In yet another aspect, a data processing device includes a storage unit to store software for displaying multiple images. The data processing device includes a processor in communication with the storage unit to execute the software for displaying multiple images. The data processing device includes a display unit in communication with the processor to display a first sequence of images on a display area based on the executed software. The software includes instructions to display the first sequence of images by manipulating at least one of the images in the first sequence. The display unit is configured to display a second sequence of images on the display area based on the executed software. The software includes instructions to display the second sequence of images by manipulating at least one of the images in the second sequence. The software can include instructions to display a transition between displaying the first set of images to displaying the second set of images. Displaying the first sequence of images can provide an appearance of a three-dimensional effect (3D) on the display area, and displaying the second sequence of images can provide an appearance of another 3D effect on the display area.

Implementations can optionally include one or more of the following features. The display unit can be configured to display the first sequence of images by displaying a given image from the first sequence of images; and moving at least a portion of the displayed given image to reveal an underlying image not yet displayed from the first sequence. The display unit can be configured to display the first sequence of images by displaying on the display area, a first image and a second image from the first sequence of images; and moving at least a portion of the displayed first image to mask at least a portion of the displayed second image. The display unit can be configured to move at least one of the images in the first sequence by performing at least one of the following: fold at least one of the images in the first sequence horizontally or vertically to display an underlying image not yet displayed from the first sequence; swing at least one of the images in the first sequence from an edge of the at least one image; or rotate at least one of the images in the first sequence from an edge of the at least one image to mask at least one other image in the first sequence.

In yet another aspect, a method performed by software executing on a data processing device includes dividing, at the data processing device, a display area into multiple arrangements of display portions. A given arrangement is different from remaining arrangements. The method includes displaying, at the data processing device, a sequence of images using a given one of the arrangements of display portions. The method includes transitioning, at the data processing device, from displaying the given sequence of images using the given one of the arrangements to displaying another sequence of images using a different arrangement. Transitioning includes replacing at least one image from the given sequence of images with at least one image from the other sequence of images. The displaying and transitioning provide an appearance of a three-dimensional (3D) effect.

Implementations can optionally include one or more of the following features. The replacing can include folding at least one image from the given sequence of images to display at least one underlying image from the other sequence of images. The replacing can include rotating at least one image from the given sequence with respect to an edge of the at least one image to mask at least one other image from the given sequence and display at least one underlying image from the other sequence of images.

The subject matter described in this specification can potentially provide one or more advantages. A sequence of digital images can be presented in an origami-like style—that is, in a manner such that the images appear to be projected on surfaces of a piece of folded paper and new images are revealed as the paper is unfolded to expose previously hidden surfaces. An image can be folded horizontally, vertically and/or diagonally to display an underlying image. Also, an image can swing or rotate from one of the edges of the image to reveal on underlying image or to mask another image. The origami-like movements used to display multiple images to provide an appearance of a 3D effect can be used in various applications. For example, the techniques, apparatus and system described in this specification can be used in any application that presents multiple images to a viewer. Examples can include: 1) a slideshow of photographs; 2) presenting album covers; 3) presenting movie posters; 4) presenting artwork in a museum; 5) presenting book covers; 6) a screen saver; etc.

The subject matter described in this specification can be implemented as a method or as a system or using computer program products, tangibly embodied in computer readable medium, such as a CD-ROM, a DVD-ROM, a semiconductor memory, and a hard disk. Such computer program products may cause a data processing apparatus to conduct one or more operations described in this specification.

In addition, the subject matter described in this specification can also be implemented as a system including a processor and a memory coupled to the processor. The memory may encode one or more programs that cause the processor to perform one or more of the method acts described in this specification. Further the subject matter described in this specification can be implemented using various data processing machines.

BRIEF DESCRIPTION OF THE DRAWINGS

FIGS. 10A and 10B show a sixth example of a layout for displaying multiple images to provide an appearance of a 3D effect.

Like reference symbols and designations in the various drawings indicate like elements.

DETAILED DESCRIPTION

Techniques, apparatus, systems and computer program products are described for displaying multiple images on a two-dimensional (2D) plane of a display device so as to provide an appearance of a three-dimensional (3D) effect. The appearance of a 3D effect can resemble paper folding movements associated with origami.

Figure 1A:
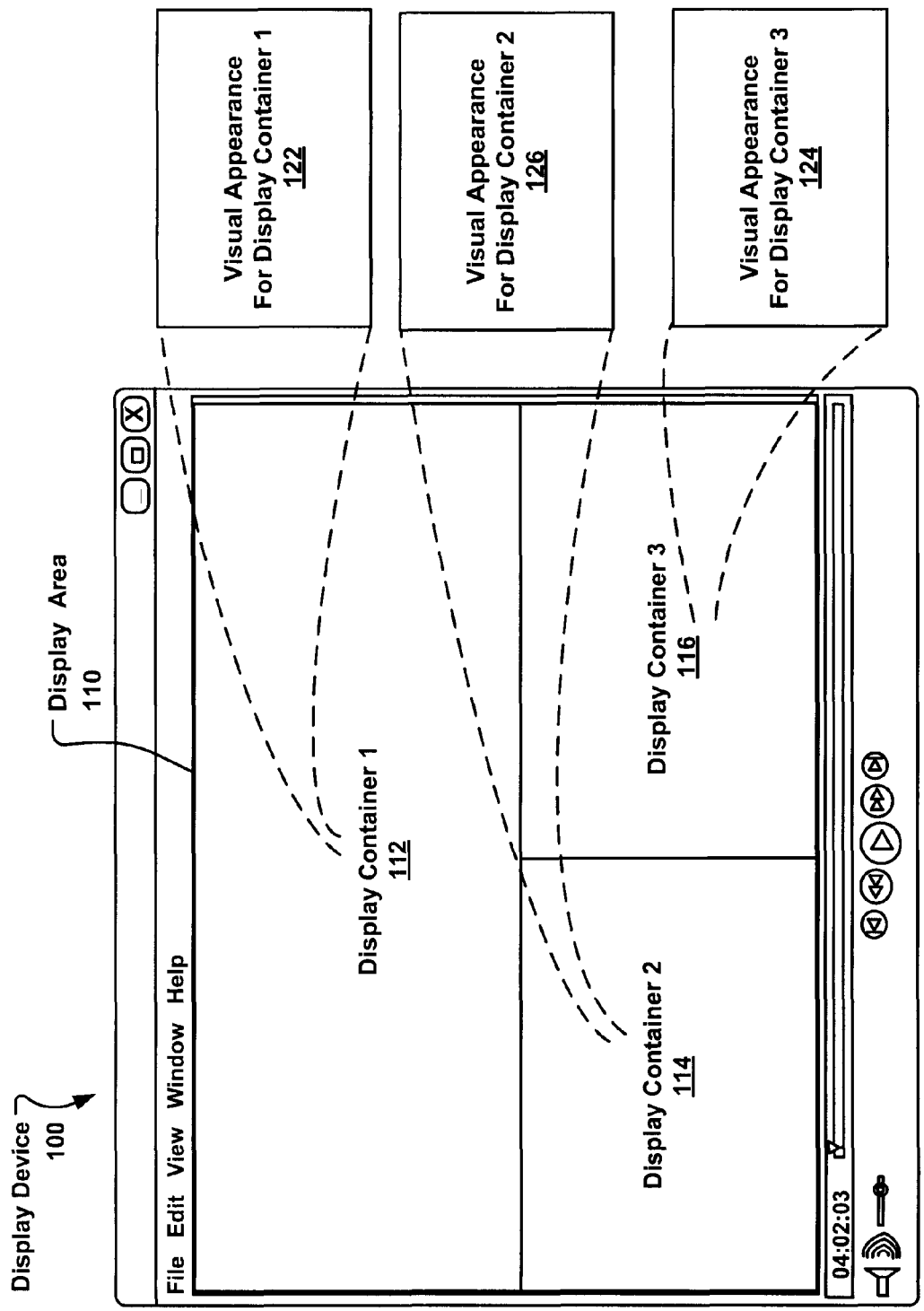
FIG. 1A shows an example of a display device that can be used to display multiple images on a two-dimensional (2D) plane of the display device so as to provide an appearance of three-dimensional (3D) effects.

FIG. 1A shows an example of a display device 100 that can be used to display multiple images on a two-dimensional (2D) plane of the display device so as to provide an appearance of three-dimensional (3D) effects. The display device 100 includes a display area 110. The display device 100 can sequentially display on the display area 110, multiple images one at a time. For example, given a set of 10 images, the display device 100 can display a first one of the 10 images on the display area 110 at a first instance. Then the remaining 9 images can be displayed one at a time at each subsequent instance until all of the 10 images are displayed.

Also, the display device 100 can divide the display area 110 into multiple display sub-areas or containers 112, 114 and 116 to display multiple images on the display area 110. Using the different containers 112, 114 and 116, different images can be displayed at the same time or at different times. While the time frames for displaying the different images using the containers 112, 114 and 116 can overlap, the different images need not be displayed simultaneously. For example, a first one of the different images can be displayed on container 1 (112) at time (t)=0 second to t=9 second. A second one of the different images can be displayed on container 2 (114) at t=3 seconds to t=12 seconds. A third one of the different images can be displayed on container 3 (116) at t=6 to t=15 seconds. In this example, each image can be displayed for 9 total seconds, with each image starting and finishing 3 seconds after a previous image. In some implementations, the different images can be displayed at the same time frame (e.g., from t=0 second to t=9 seconds for all three). In other implementations, there may not be any overlap between the different time frames for displaying the different images.

The display containers 112, 114 and 116 can be associated with visual appearances 122, 124 and 126. For example, the display container 1 (112) can be associated with the visual appearance 122. The display container 2 (114) can be associated with the visual appearance 124. The display container 3 (116) can be associated with the visual appearance 126. Each display container can be associated with a visual appearance different form other display containers. Also, some of the display containers can share the same visual appearance.

Figure 1B:
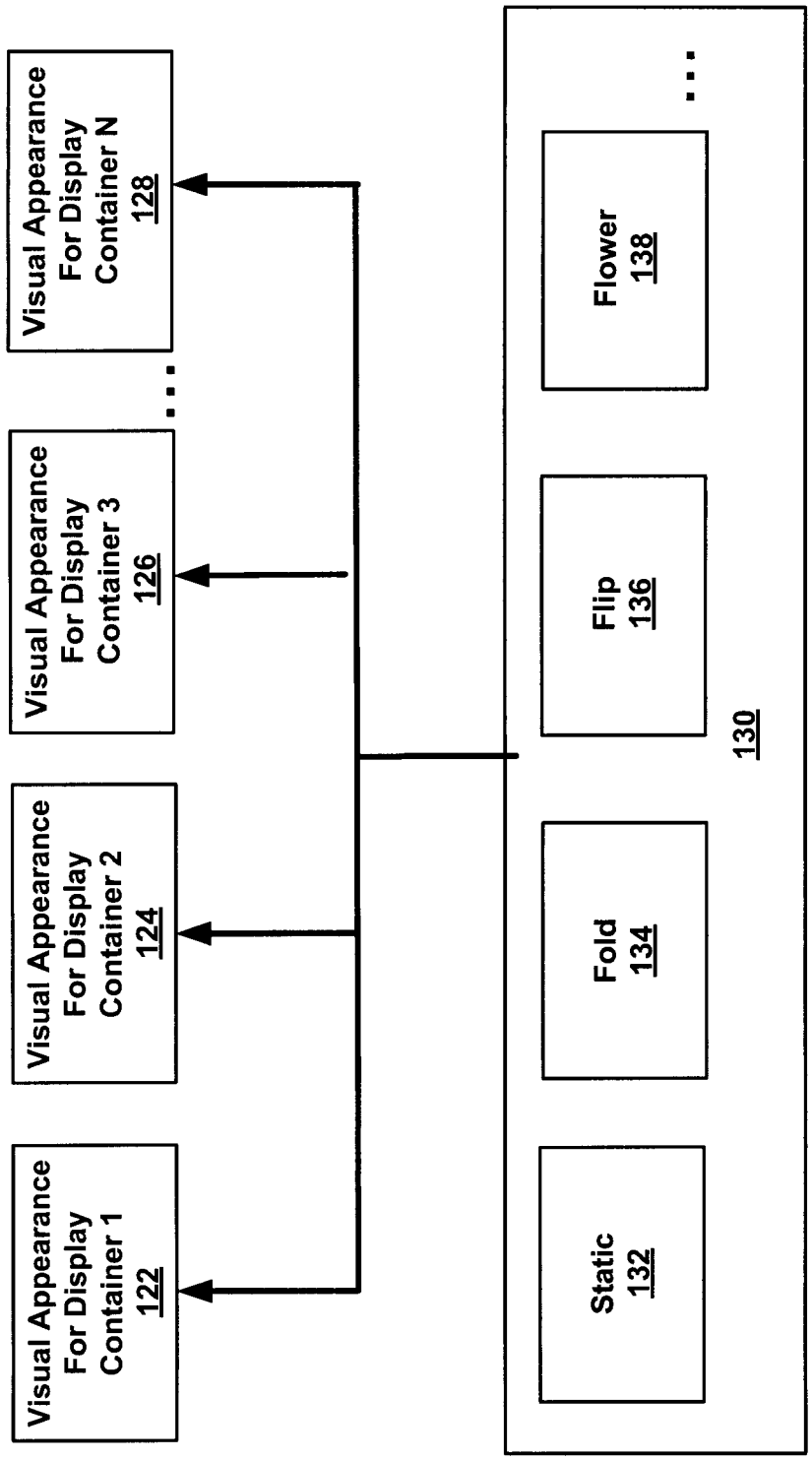
FIG. 1B shows different examples of visual appearances available for display containers.

FIG. 1B shows different examples of visual appearances available for display containers. Various visual appearances 130 can be implemented for the different display containers 112, 114 and 116 to provide an appearance of a 3D effect. Examples of visual appearances can include a static appearance 132, a fold 134, a flip 136 and a flower or petal fold 138. The static appearance 132 can represent not moving a given container (and an associated image). The fold 134 can represent bending or folding a given container (and an associated image) along an x-axis, a y-axis or a diagonal line. The folded image can be covered by a different image. The flip 136 can represent rotating or flipping a given container (and an associated image) at an edge of the container along an x-axis or a y-axis. A result of a flip is to cover up one image and reveal a different image. The flower 136 can represent unraveling or unfolding (e.g., similar to a flower opening its petals as it blooms) a given container (and an associated image) to reveal a different image.

Figure 1C:
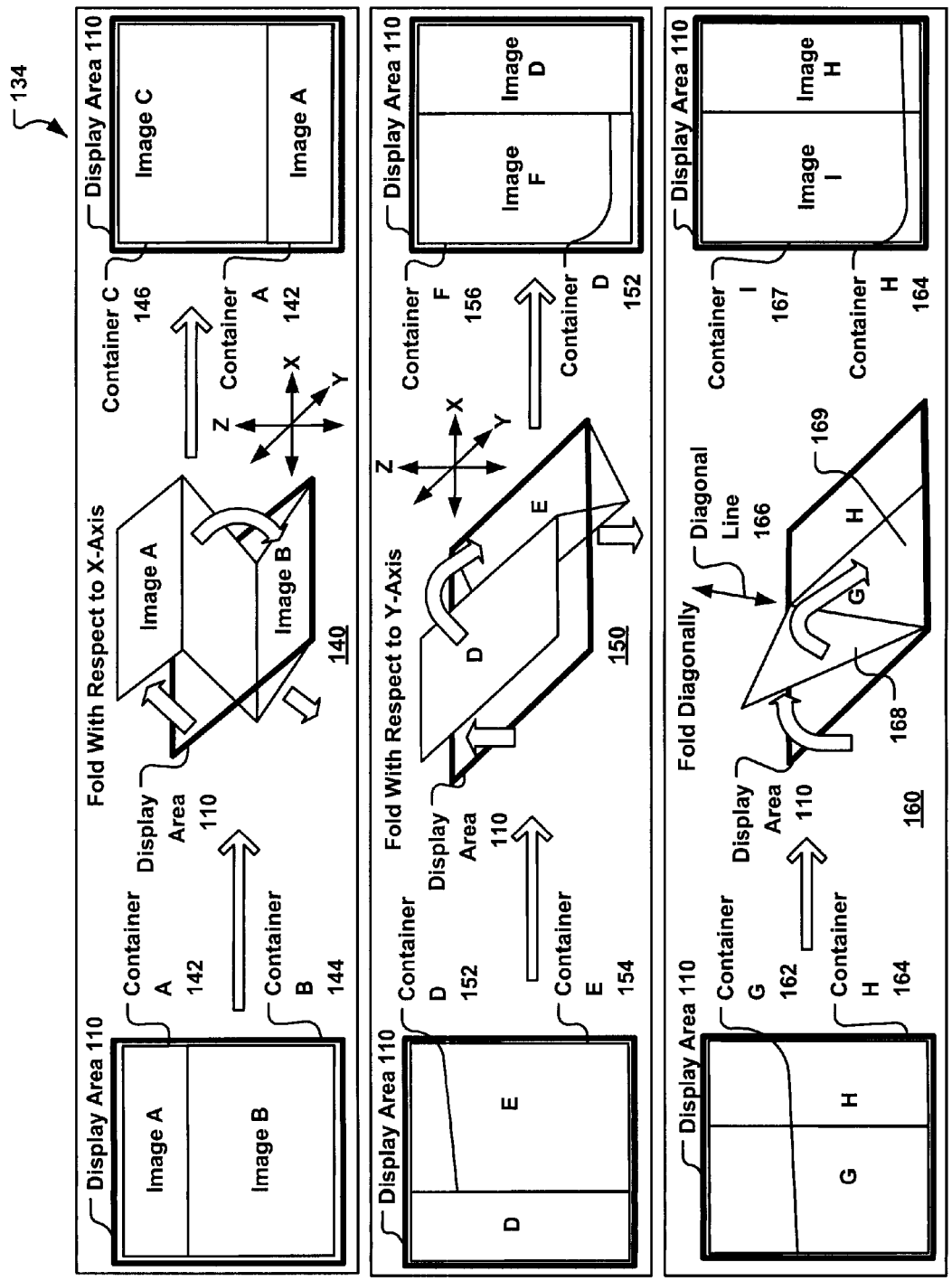
FIG. 1C shows different examples of a fold.

FIG. 1C shows different examples of a fold 134. In a top panel 140, a display area 110 is shown on the left-hand side with image A and image B displayed using display containers A 142 and B 144. Image A and associated container A 142 are positioned above image B and associated container B 144. Container B 144 is associated with a fold appearance as shown in the middle of the top panel 140. Image B in container B 144 is folded along an x-axis so as to cause image A in container A 142 to cover-up image B. As shown on the right-hand side of the top panel, movement of container A 142 and associated image A during the fold reveals a new image C and an associated container C 146. In some implementations multiple images and associated containers can be revealed A middle panel 150 shows another example of a fold appearance. A display area 110 is shown on the left-hand side with image D and image E displayed using associated display containers D 152 and E 154. Image D and associated container D 152 are positioned to the left of image E and associated container E 154. Container E 154 is associated with a fold appearance as shown in the middle of the middle panel 150. Image E in container E 154 is folded along a y-axis so as to cause image D in container D 152 to cover-up image E. As shown on the right-hand side of the middle panel 150, movement of container D 152 and associated image D during the fold reveals a new image F and an associated container F 156. In some implementations multiple images and associated containers can be revealed A bottom panel 160 shows yet another example of a fold appearance. A display area 110 is shown on the left-hand side with image G and image H displayed using display containers G 162 and H 164. Image G and associated container G 162 are positioned to the left of image H and associated container H 164. Container H 164 is associated with a fold appearance as shown in the middle of the bottom panel 160. Image G in container G 162 is folded along a diagonal line 166 (e.g., across two opposite corners of container H 162 to create a first triangle portion 168 that covers up rest of image G. As the two triangle portions fold over one another, another image I is revealed at associated container 1167.

Figure 1D:
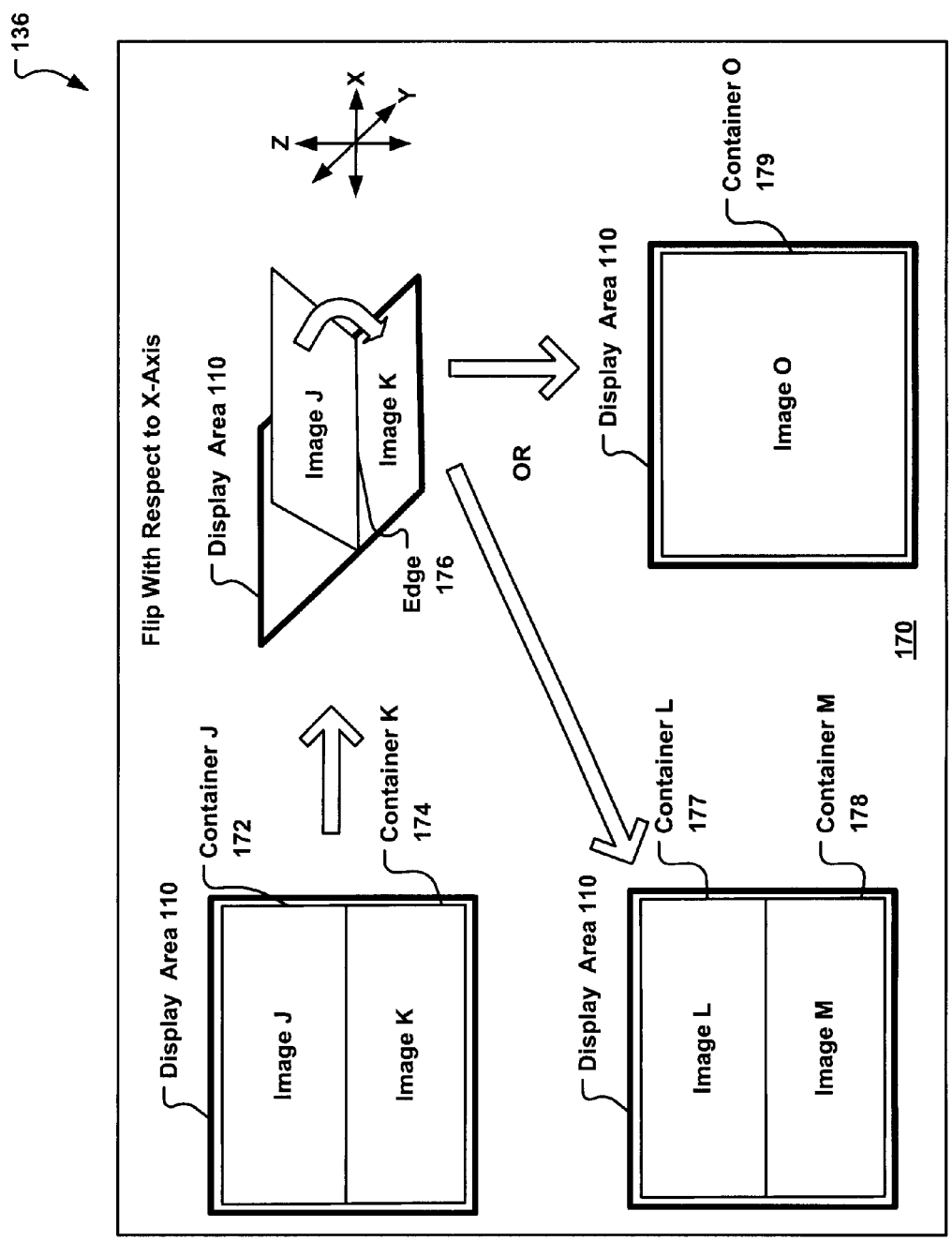
FIG. 1D shows an example of a flip.

FIG. 1D shows an example of a flip 136. In a panel 170, a display area 110 is shown on the upper left-hand side with images J and K displayed using display containers J 172 and K 174 respectively. Image J and an associated container J 172 are positioned above image K and an associated container K 174. Container J 172 is associated with a flip appearance as shown in the upper right-hand side of the panel 170. Image J in container J 172 flips along a bottom edge 176 of container J with respect to an x-axis to cover up image K in container K 174. Two different results of the flip as described are shown on the lower left-hand and lower right-hand sides. On the lower left-hand side of the panel 170, the flip can cause multiple new images to be displayed. For example, a new image L and associated container L 177 can be displayed at the previous location of Image J and associated container J 172. Also, another new image M and associated container M 178 can be displayed at the previous location of the covered-up image K.

In some implementations, the flip can reveal a single new image and associated container. For example, on the lower right-hand side of the panel 170, a new image O and associated container O 177 can be displayed at the previous locations of images L and M and associated containers J 177 and K 178.

Figure 1E:
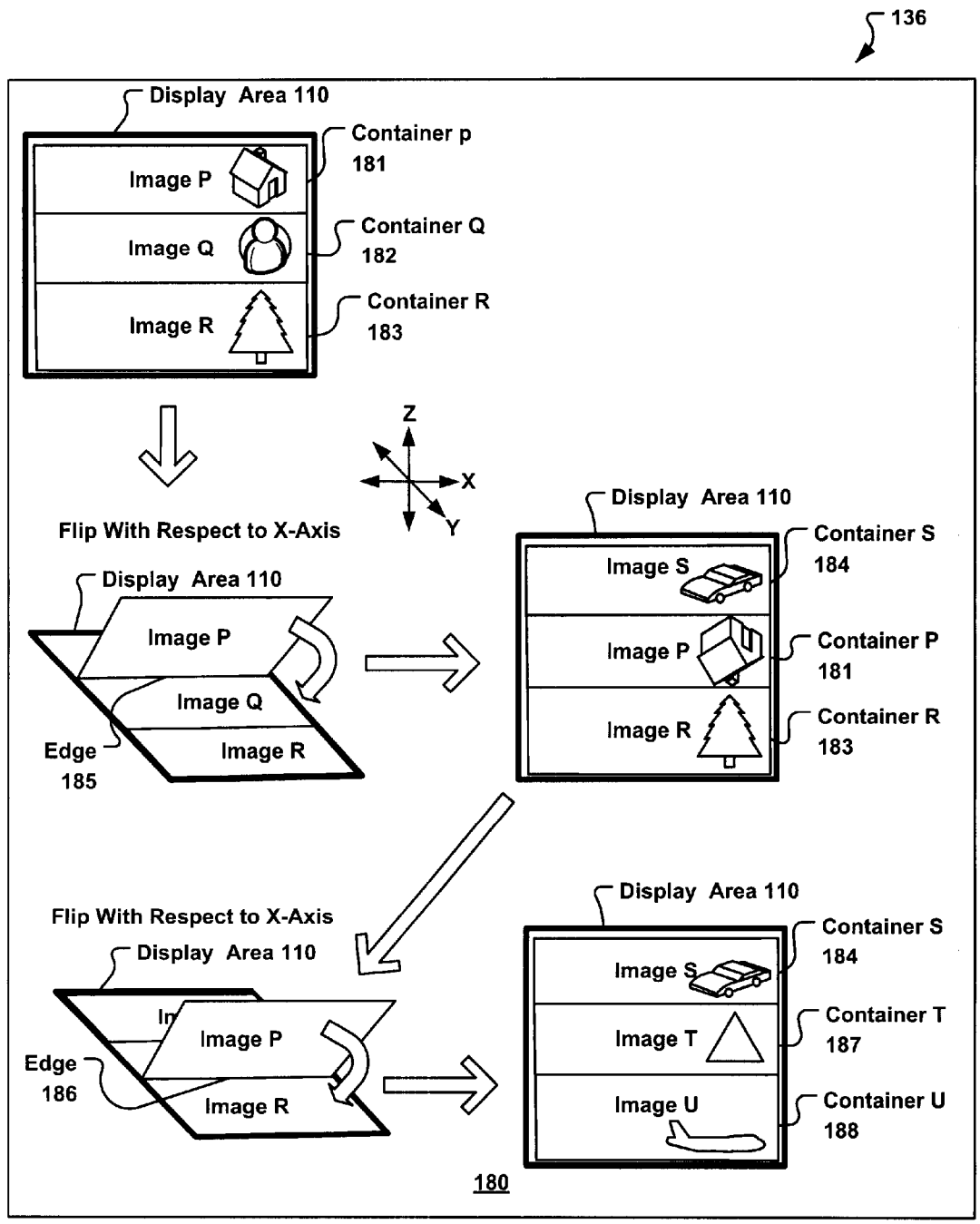
FIG. 1E shows another example of a flip appearance.

FIG. 1E shows another example of a flip appearance. At a top row of a panel 180, a display area 110 is shown with images P, Q and R displayed using associated display containers P 181, Q 182 and R 183. Image P and associated container P 181 are positioned above image Q and associated container Q 182. Image R and associated container R 183 are positioned below image Q. Container Q 184 is associated with a flip appearance as shown in remaining two rows (e.g., below the top row) of the panel 180. Image P in container P 181 can flip or rotate along a bottom edge 185 of container P 181 with respect to an x-axis to cover up image Q in container Q 182. The flip along the edge 185 can cause a mirrored or reflected image of image P to be displayed over image Q and the associated container Q 182. For example, when image P represents an image of a house, the flip of image P and the associated container P 181 can render an upside down image of the house.

As shown in FIG. 1E, the flip can continue as shown at the bottom row of the panel 180. Image P (e.g., the upside-down image of a house) and its associated container 181 can be rotated or flipped along a bottom edge 186 of container P 181 with respect to an x-axis to cover up image R in container R 183. Once image P and its associated container 181 flip over and cover the last image (e.g., image R) along a path of the flip, the flip ends. The result of the completed flip can reveal new images, such as images S, T and U and associated containers 184, 187 and 188 respectively.

Figure 1F:
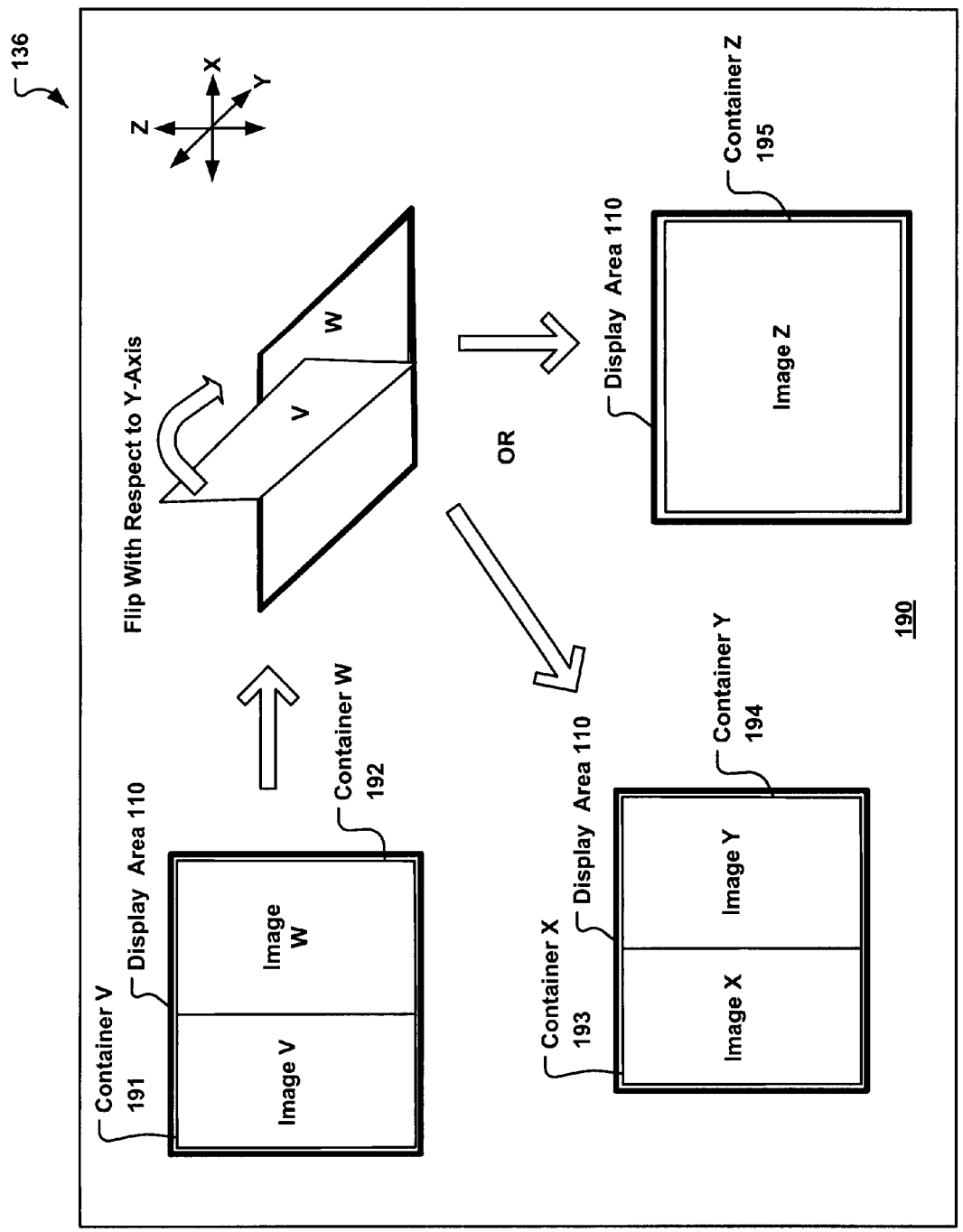
FIG. 1F shows yet another example of a flip.

FIG. 1F shows yet another example of a flip. In a panel 190, a display area 110 is shown on the upper left-hand side with images V and W displayed using display containers V 191 and W 172 respectively. Image V and an associated container V 191 are positioned to the left of image W and an associated container W 192. Container V 191 is associated with a flip appearance as shown in the upper right-hand side of the panel 190. Image V in container V 172 can flip along an edge (e.g., right side edge) of container J with respect to an x-axis to cover up image W in container W 192.

Two different results of the flip as described are shown on the lower left-hand and lower right-hand sides. On the lower left-hand side of the panel 190, the flip can cause multiple new images to be displayed. For example, a new image X and associated container X 193 can be displayed at the previous location of Image V and associated container V 191. Also, another new image Y and associated container Y 194 can be displayed at the previous location of the covered-up image W.

In some implementations, the flip can reveal a single new image and associated container. For example, on the lower right-hand side of the panel 190, a new image Z and associated container Z 195 can be displayed at the previous locations of images X and Y and associated containers X 191 and Y 192.

Figure 1G:
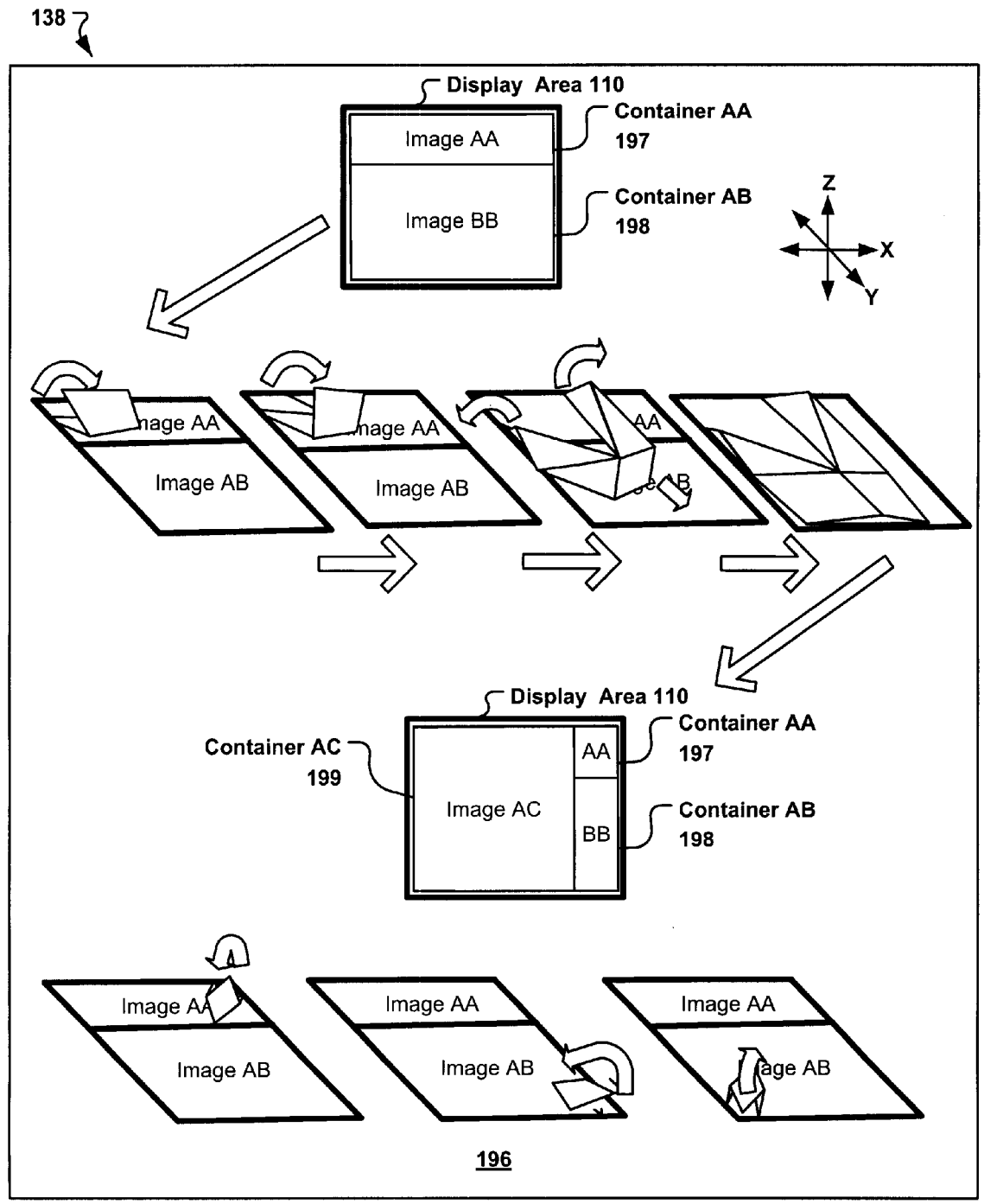
FIG. 1G shows an example of a flower or petal fold.

FIG. 1G shows an example of a flower or petal fold. At a top or first row of a panel 196, a display area 110 is shown with images AA and AB displayed using containers AA 197 and AB 198 respectively. At a next or second row, the flower or petal fold effect is shown in four sequential images. Starting from the left-most image in the second row, a top left hand corner of image AA begins to unfold, similar to a petal fold in origami. Following the arrows across the second row to the right, the unfolding of image AA progresses until a new image AC is revealed over portions of image AA and image AB in the third row. Image AC is associated with a new container AC 199. Also, the flower effect can be implemented to unfold to reveal a new image that covers-up all of images AA and AB, all of image AA, all of image AB, portions of image AA and portions of image AB.

Additionally, the flower or petal fold 138 can be implemented to being the unfolding at any corner of a given image. The last row of images in panel 196 shows the unfolding beginning at the upper right corner, the lower right corner and the lower left corner.

Figure 2:
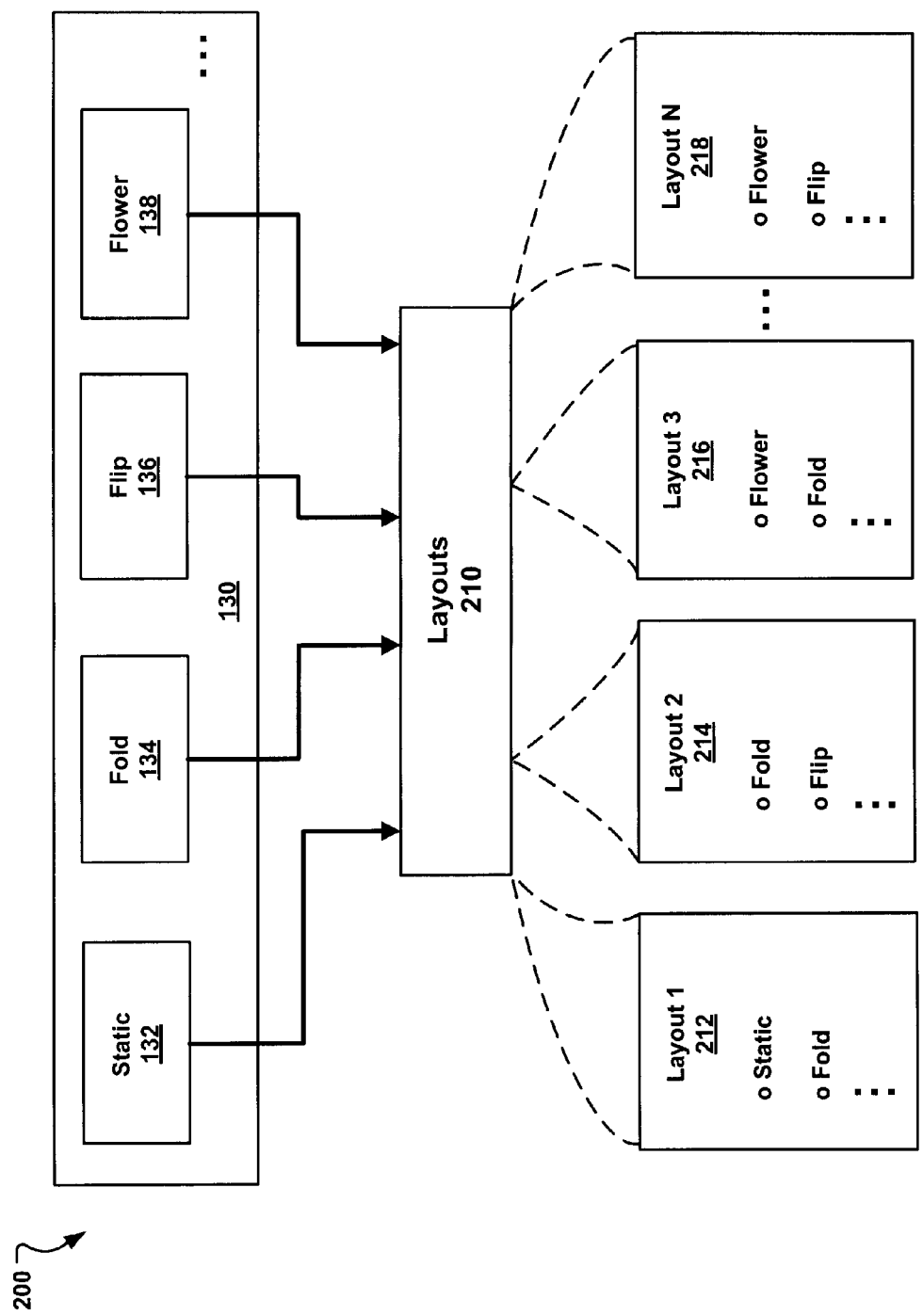
FIG. 2 shows a process for generating different layouts for displaying multiple images so as to provide an appearance of a 3D effect.

FIG. 2 shows a process 200 for generating different layouts for displaying multiple images so as to provide an appearance of a 3D effect. A layout 210 can be created using one or more of the different visual appearances 130, such as the static appearance 132, the fold 134, the flip 134 and the flower 136. FIG. 2 shows examples of different layouts, such as layout 1 (212), layout 2 (214), layout 3 (216) through N (218). Layout 1 (212) can include at least the static 132 and the fold 134, for example. Layout 2 (214) can include at least the fold 134 and the flip 136. Layout 3 (216) can include at least the flower 138 and the fold. Layout N can include at least the flower 138 and the flip 136. Other layouts can be created by combining the different visual appearances. A layout can be predefined or created in real time.

Each layout can be associated with one or more images, such as 1-10 images. Different layouts can be associated with different number of images or all layouts can be associated with the same number of images. The images associated with the given layout can intermix with each other by folding and bending according to the visual appearances included in the layout (see example layouts 1-N above) to display and hide (or mask) other photos. Each layout can be played on a display unit for a duration defined by that layout.

Figure 3:
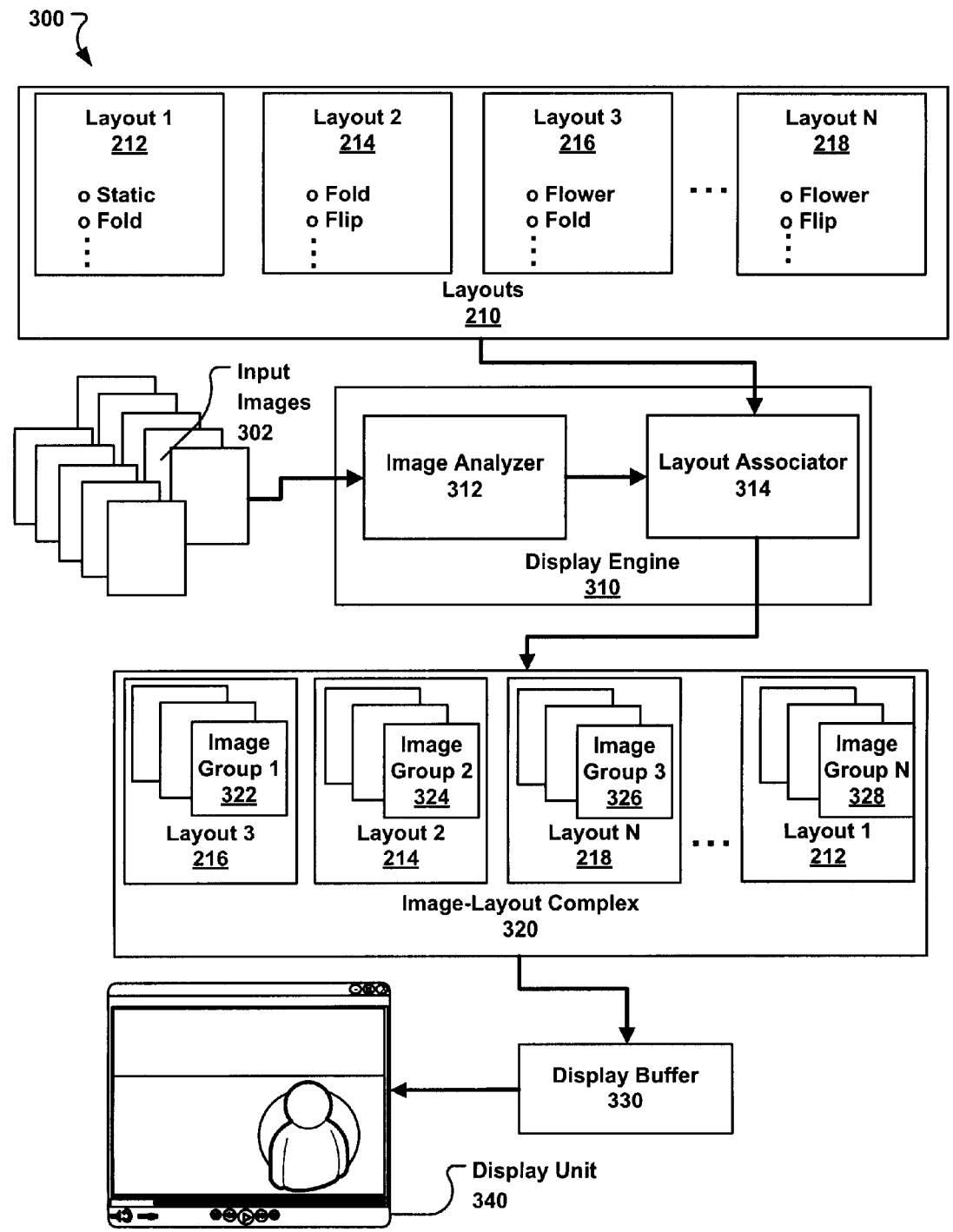
FIG. 3 shows an example of a system for using the different layouts to display a given set of input images so as to provide the appearance of a 3D effect.

FIG. 3 shows an example of a system 300 for using the different layouts 210 to display a given set of input images so as to provide the appearance of a 3D effect. The system 300 can be part of a data processing apparatus, such as a computer, a laptop or a smart phone that can process and display images. The system 300 can be implemented as software executed by a processor on the data processing apparatus. Also, the system 300 can be implemented as a pre-configured integrated circuit, such as a field-programmable gate array (FPGA). The components of the system 300 can be implemented as different programmable logic components or logic blocks.

The system 300 can include a display engine 310 that processes input images and displays the input images using different layouts. The display engine 310 can include an image analyzer or receiving unit 312 to receive input images 302 to be displayed using different layouts 210. The images 302 can be received from a storage device, such as a hard drive or a portable storage medium. In addition, the images 302 can be identified by a user in a request to display the identified images. The images 302 can include various types of graphics data, such as photographs, drawings, paintings, documents, etc.

The image analyzer 312 can analyze the images 302 to identify image characteristics, such as the aspect ratio and faces of people within each image. To identify the faces, a facial recognition algorithm can be executed. When a face is identified within an image, various aspects of the identified face can be detected. For example, the location and position of the face within an image can be detected. Also, the image analyzer detects the direction of the detected face: left-facing, right-facing, forward facing, back-facing, etc. The identified image characteristics are provided to a layout associating unit 314 of the display engine 310. Based on the identified characteristics of the images 312, the layout associating unit 314 searches the available layouts 210 to identify the best matching layout for a given set of images. Also, the layout associating unit 314 can identify the best location (e.g., container or display portion) for a given image in a given layout based on the detected image characteristics. For example, an image can be associated with a container having a given display appearance or effect (e.g., flip, fold, flower, etc.) and/or a particular position on a display area. Also, a given image can be associated with a given display container so that the identified faces of people in the given image can be centered.

The received images 302 can be divided into groups of images, such as group 1 (322), group 2 (324), group 3 (326) through group N (328) as shown in FIG. 3. Each group can include a set number of images as defined by a given layout. Additionally, the images can be divided using a sequential order, a random order, a user defined order, or based on a search for an image having a desired image characteristic (e.g., aspect ratio, faces of people, etc.).

Using a sequential order, for example, the first group 322 can be created using the first 10 images from the received images 302. The second group 324 can be created using the next 10 images from the received images 302. The third group can be created using the third set of 10 images form the received images 302. The rest of the images 302 can be likewise grouped until all of the images 302 are assigned to a group.

For each of the groups of images 322, 324 and 326, the layout associating unit 314 can identify the best layout based on the image characteristics, such as the aspect ratio and faces of people in the images of each group. The layout associating unit 314 can associate each group with the identified layout. Figure reference number 320 shows examples of layouts associated with image groups. For example, image group 1 (322) can be associated with layout 3 (216); image group 2 (214) can be associated with layout 2 (214), image group 3 can be associated with layout N (218) and image group N can be associated with layout 1 (212). Other associations of image groups to layouts can be implemented by identifying the best layout for each image group based on the image characteristics.

Additionally, as described above, the images in the each group can be arranged to fit the identified layout. For example, a given layout can include three image containers with a first image container taking up top half of a display area, a second image container taking up a quarter of the display area at bottom left and a third image container taking up the remaining quarter of the display area at bottom right. For the given layout, a first image in a given group can be associated with the first image container, a second image can be associated with the second image container, and the third image can be associated with the third image container. As described above, each image container of a given layout 210 can be associated with different visual appearances, such as flip, fold and flower. For example, the first container can be associated with a flip, the second container can be associated with a fold and the third container can be associated with a flower. By folding, flipping, flowering, etc., the images associated with the image containers can be presented to have an appearance of 3D motion or effect.

If a given group includes more images than the number of containers, more than one image can be associated with each container in a layout. For the example described in the previous paragraph, if the given group includes six images, at least one container can be associated with multiple images. After three of the images in the given group are displayed using the three containers, one of the containers can be folded, flipped or flowered to reveal a fourth image in the given group. Similarly, each of the remaining images in the given group can be displayed by manipulating or moving at least one of the containers to reveal the image. The containers can be manipulated or moved in 3D space in such manner until all images in the given group are displayed in a particular sequence. The images in a given group can be chosen and displayed in sequential order or in any other select (e.g., based on image characteristics) or random orders. When all of the images are displayed, a transition can be displayed before a second group of images are displayed using a layout associated with the second group. In such manner, all of the groups can be displayed, each using an associated layout.

Additionally, an image can be modified to fit within a container of a layout. Modifying the image can include resizing, scaling, positioning, cropping, color correction, brightness control, contrast control, encoding, decoding, etc.

The layouts associated with image groups (e.g., image-layout complexes) 320 can be played or executed on a display unit to display the associated images so as to provide an appearance of a 3D effect. Additionally, before displaying the images, the layouts with associated images can be sent to a display buffer 330 and temporarily held there until ready to be displayed on the display unit 340.

The images can be associated with the layouts in real-time during a display session, such as a slideshow. For example, during a playback of the first image-layout complex, the second image-layout complex can be generated. Each subsequent image-layout complex can be generated during the playback of the previous image-layout complex. Additionally, the groups of images can be associated with the appropriate layouts before starting the display session.

To maximize the interest level of a viewer, different rules for selecting layouts can be implemented. For example, while a given layout can be repeated, the given layout may not be chosen twice in a row. Additionally, the least used layout can be selected as long as the given images match the layout.

Figure 4:
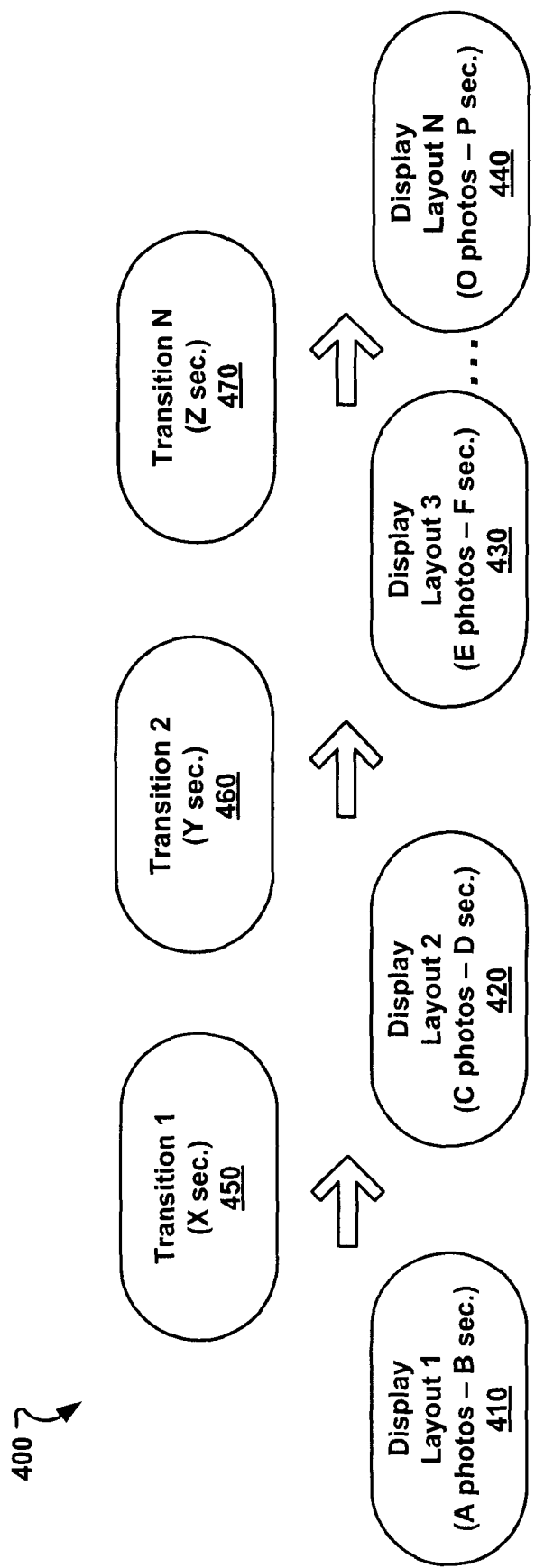
FIG. 4 shows an example of an arrangement of different layouts for a display session.

FIG. 4 shows an example of an arrangement 400 of different layouts for a display session. As described above, a given layout is associated with at least one image. Additionally, a given layout can configured to be played for a given time duration, such as a range from 1 second up to 60 seconds. The display duration for a given layout can depend on factors, such as the number of images associated with the layout, the number of visual appearances included in the layout and the different types of visual appearances included in the layout. A given visual layout may run longer than another visual layout, for example.

Figure references 410, 420, 430 and 440 represent presentation or displaying of the layouts with the associated image groups. The presentation of the layouts with the associated images can be connected to each other using transitions 450, 460 and 470 so as to provide seamless transitions between the presentations of the layouts. Examples of the transitions 450, 460 and 470 can include a simple flip between two connecting layouts, a fold, or an accordion type of movement between the layouts. Examples of the different types of transitions are described further in FIGS. 18, 19 and 20 below. The transitions 450, 460 and 470 can be selected based on a wireframe of a location where the two layouts connect. Additionally, the locations of the images (e.g., location of associated containers) can be considered in selecting a transition that lines up with both layouts. If none of the transitions lineup with both layouts, a transition that lines up with one of the two layouts (e.g., the first layout) can be selected. A given transition has an associated display time duration in a range of 1 to 60 seconds, for example. The display time duration for a given transition can be the same or different from other transitions.

FIGS. 5-17 show different examples of layouts for associating with and displaying multiple images. Each layout including one or more of the available visual appearances or effects, such as the fold, flip and flower as described with respect to FIGS. 1A-1G and 2-4 above.

Figure 5:
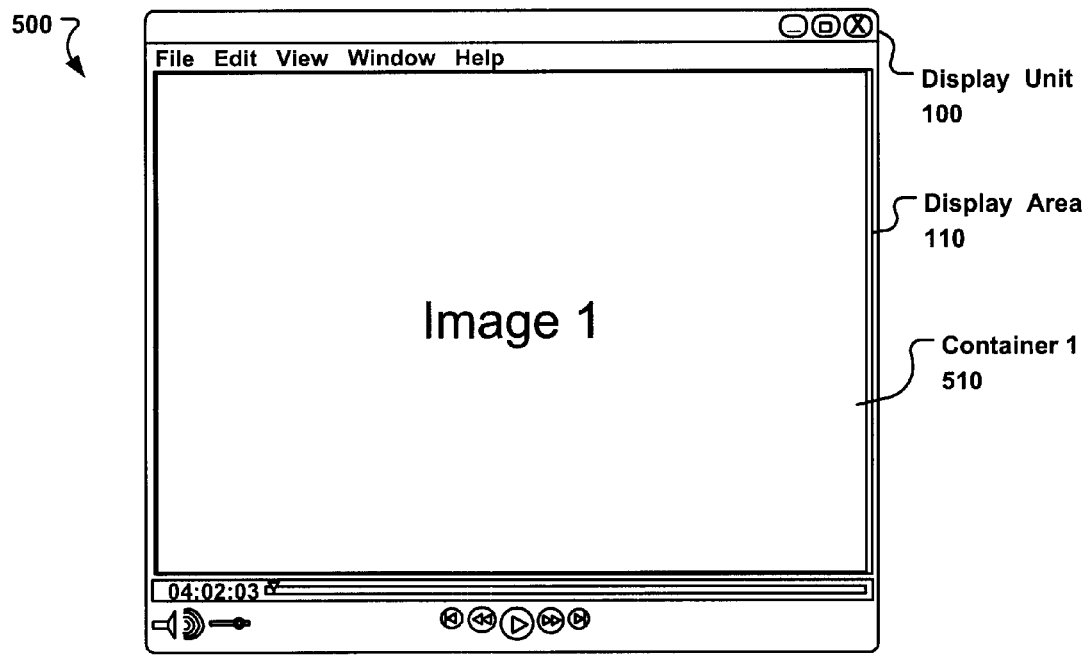
FIG. 5 shows an example layout for displaying multiple images to provide an appearance of a 3D effect.

FIG. 5 shows an example layout 500 for displaying multiple images to provide an appearance of a 3D effect. A display unit 100 includes a display area 110, which is not subdivided. A single container 1 (510) is included in the display area 110 to display a single image at a time. The visual appearance of image 1 and container 1 (510) is static, with no 3D effect. However, the available transitions described above can be used to connect to and from the layout 500 to provide the appearance of a 3D effect.

Figure 6:
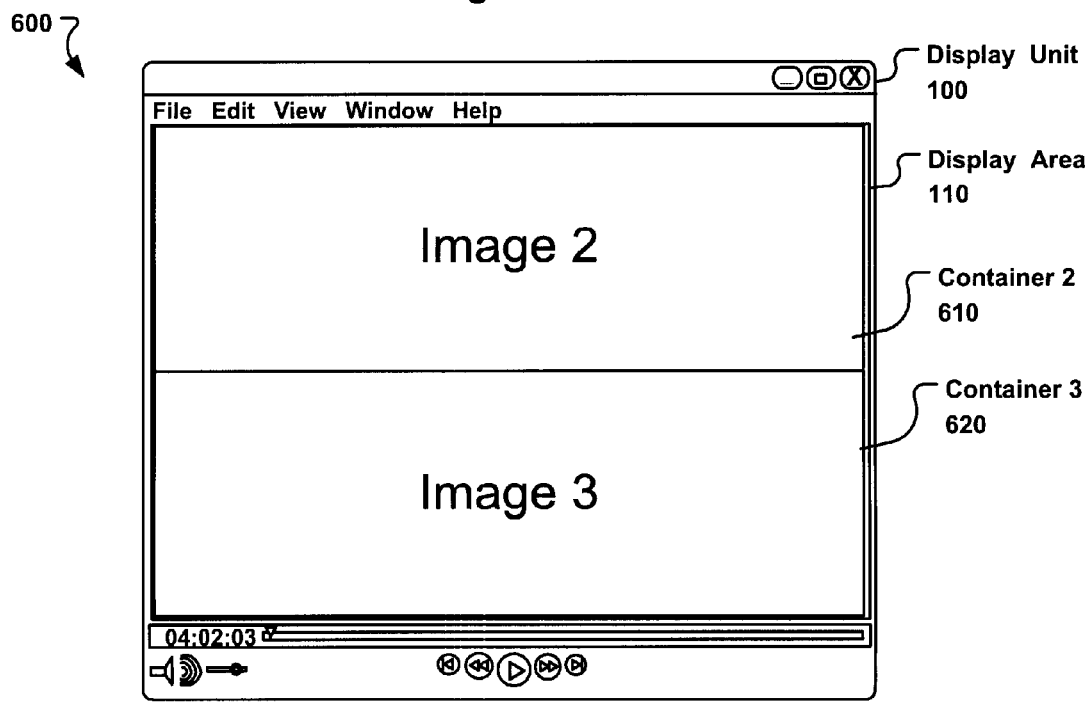
FIG. 6 shows a second example of a layout for displaying multiple images to provide an appearance of a 3D effect.

FIG. 6 shows a second example of a layout 600 for displaying multiple images to provide an appearance of a 3D effect. A display unit 100 includes a display area 110, which is subdivided into two display portions or containers. Container 2 (610) and container 3 (620) are used to display images 2 and 3. The visual appearance of the images 2 and 3 and corresponding containers 2 (610) and 3 (620) is static, with no 3D effect. However, the available transitions described above can be used to connect to and from the layout 700 to provide the appearance of a 3D effect.

Figure 7:
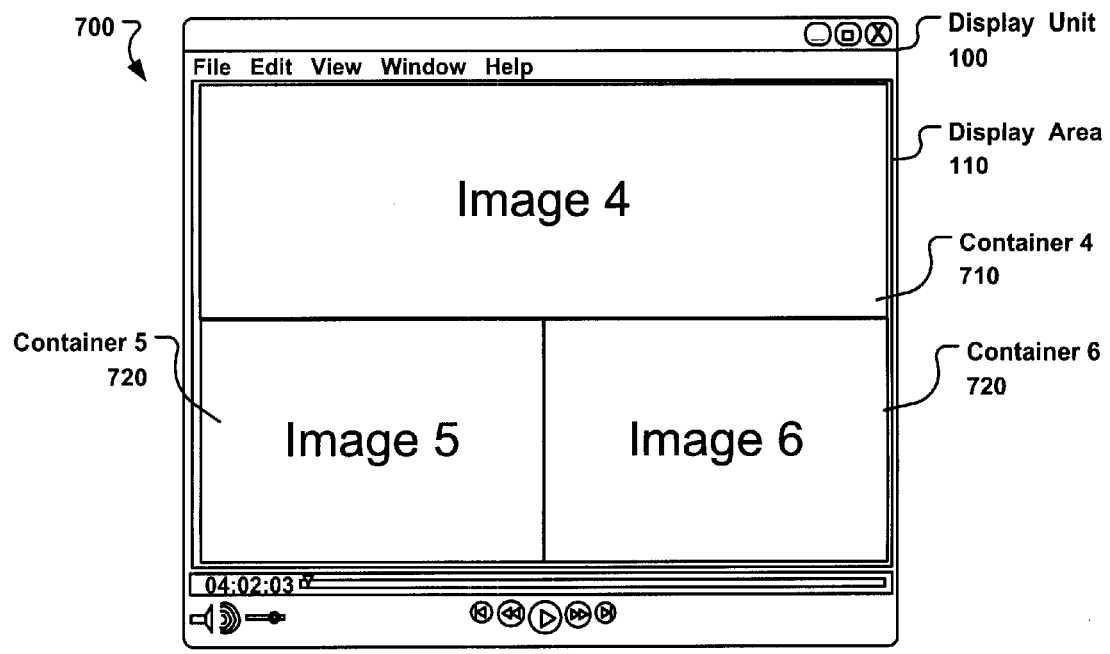
FIG. 7 shows a third example of a layout for displaying multiple images to provide an appearance of a 3D effect.

FIG. 7 shows a third example of a layout 700 for displaying multiple images to provide an appearance of a 3D effect. A display area 110 of a display unit 100 is subdivided into three display portions or containers. Container 4 (710) is used to display image 4 at the top of the display area 110. Container 5 (720) is used to display image 5 below image 4 at a lower left-hand side of the display area 110. Container 6 (730) is used to display image 6 below image 4 at a lower right-hand side of the display area 110. The visual appearance of the images 4, 5 and 6 and corresponding containers 4 (710), 5 (720) and 6 (730) is static, with no 3D effect. However, the available transitions described above can be used to connect to and from the layout 600 to provide the appearance of a 3D effect.

Figure 8:
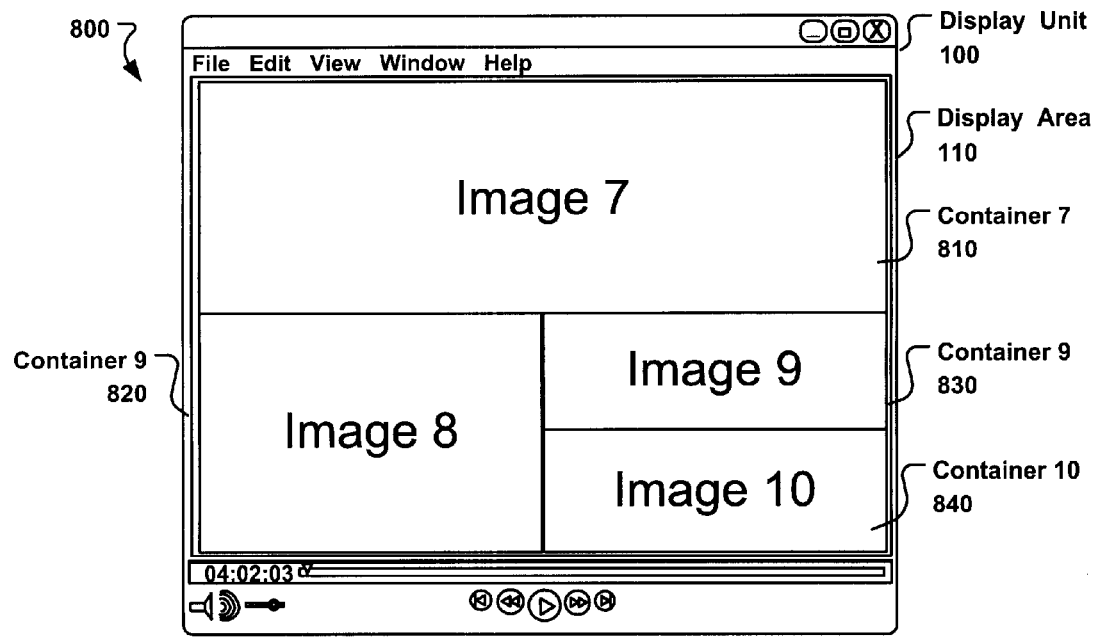
FIG. 8 shows a fourth example of a layout for displaying multiple images to provide an appearance of a 3D effect.

FIG. 8 shows a fourth example of a layout 800 for displaying multiple images to provide an appearance of a 3D effect. A display area 110 of a display unit 100 is subdivided into four display portions or containers. Container 7 (810) is used to display image 7 at the top of the display area 110. Container 8 (820) is used to display image 8 below image 7 at a lower left-hand side of the display area 110. Container 9 (830) is used to display image 9 below image 4 at a middle right-hand side of the display area 110. Container 10 (840) is used to display image 10 below image 9 at a lower right-hand side of the display area 110. The visual appearance of the images 7, 8, 9 and 10 and corresponding containers 7 (810), 8 (820), 9 (830) and 10 (840) is static, with no 3D effect. However, the available transitions described above can be used to connect to and from the layout 800 to provide the appearance of a 3D effect.

Figure 9:
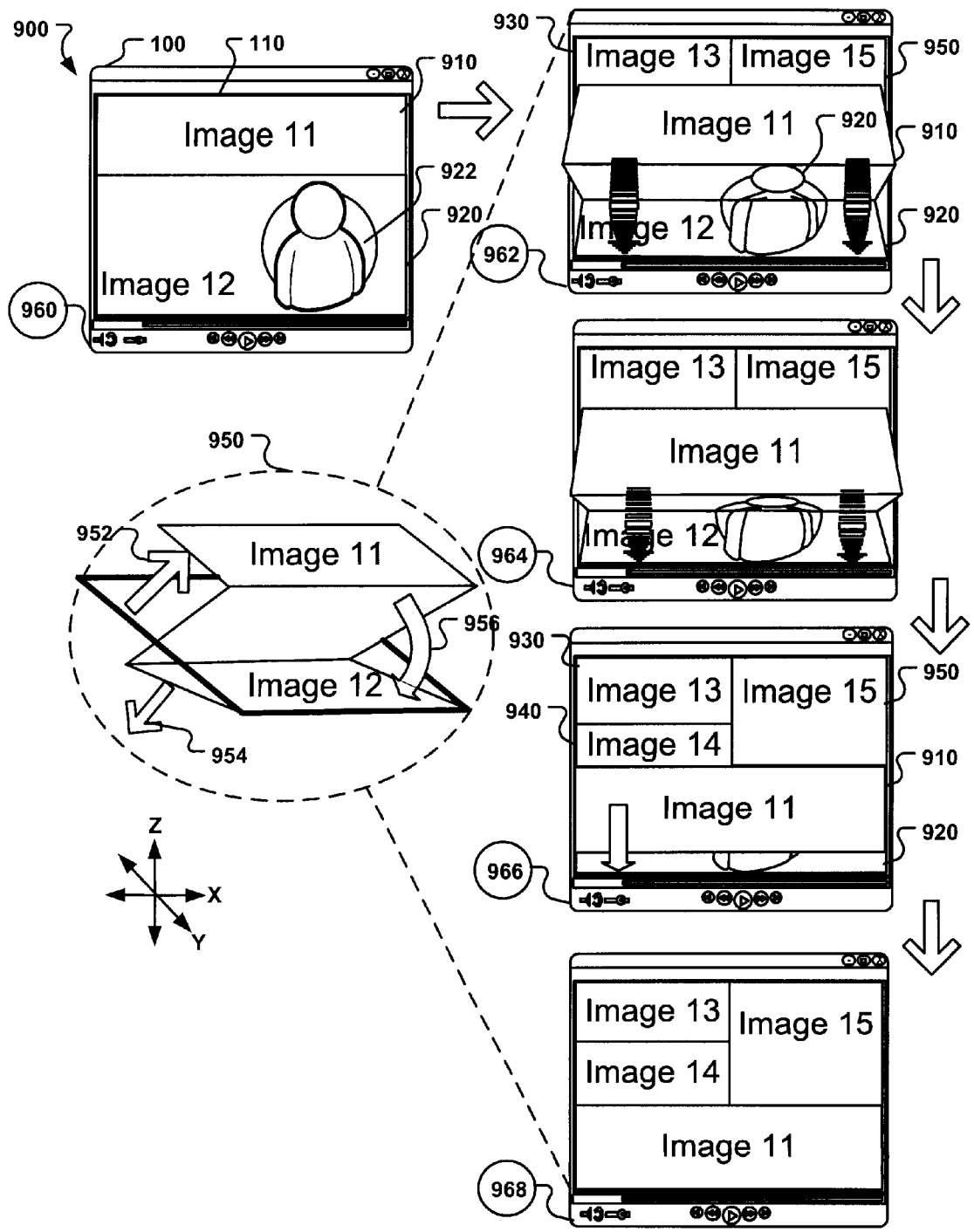
FIG. 9 shows a fifth example of a layout for displaying multiple images to provide an appearance of a 3D effect.

FIG. 9 shows a fifth example of a layout 900 for displaying multiple images to provide an appearance of a 3D effect. The display area 110 of a display unit 100 is subdivided into two display portions or containers 910 and 920. Image 11 and associated container 910 is located above image 12 and associated container 920. For illustrative purposes, image 12 includes an image of a person 922. One of the visual appearances included in layout 900 is a fold along an x-axis. For example, image 12 and associated container 920 is shown to undergo the fold appearance.

Reference numbers 960, 962, 964, 966 and 968 encased in circles represent the different snapshots of the folding process. Starting with panel 960, image 12 and container 920 are shown before the fold process. Panel 962 is a snapshot of image 12 and associated container 920 in the middle of the fold process. The figure of the man 922 is shown folded over at an angle as image 12 begins to fold into itself. As image 12 is being folded, image 11 and container 910 is pulled towards the bottom of the display area 110. The movement of image 11 and container 910 reveals new images 13 and 15 (and associated containers 13 and 16) from behind image 11 and container 910.

Panel 964 shows another snapshot of the fold process with image 12 and container 920 folded even more than the snapshot in panel 962. The head area of the person 922 is barely visible. Image 11 and container 910 has been pulled further towards the bottom of the display area 110 to reveal even more of images 13 and 15.

Panel 966 shows yet another snapshot of the fold process with image 11 and container 910 covering up or hiding nearly all of image 12. The progression of image 11 over image 12 reveals yet another image 14 (and associated container 14). Panel 968 shows an end of the fold process with image 11 completely covering up image 12.

Additionally, a perspective view 950 of the fold process is shown within a dashed circle to further illustrate the appearance of the 3D effect generated. In the perspective view 950, three arrows are shown to illustrate the movement of images 11 and 12. For example, the arrow 952 shows image 11 being pushed down and out of the display unit 100 towards the bottom of the display area 110. Arrow 954 shows image 12 being folded and pushed into the display unit 100. The curved arrow 956 shows image 12 being folded onto itself and being covered up by image 11.

While the fold process revealed three hidden images in FIG. 9, different number of images can be revealed. In addition, the layout of the images including the hidden images can be varied based on the image characteristics of the images associated with the layout 900.

Figure 10A:
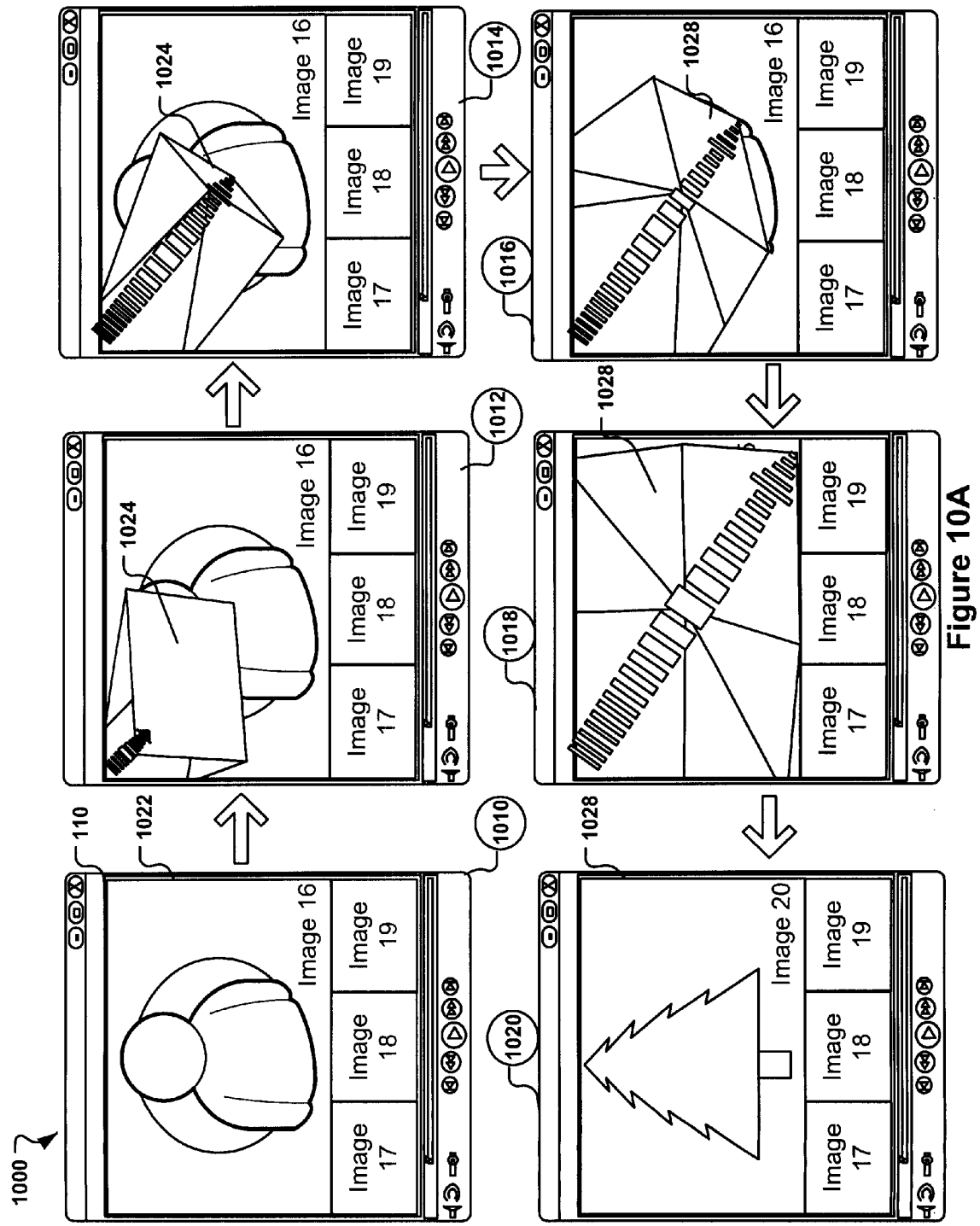

FIGS. 10A and 10B show a sixth example of a layout 1000 for displaying multiple images to provide an appearance of a 3D effect. The layout 1000 includes a flower effect and a flip effect. FIG. 10A shows the flower effect and FIG. 10B shows the flip effect. In FIG. 10A, reference numbers 1010, 1012, 1014, 1016, 1018 and 1020 encased in circles represent the different snapshots of the flower effect. The snapshot 1010 shows image 16 (and associated container 1022) located at the top of the display area 110 with images 17, 18 and 19 located below. The visual appearance of container 1022 and image 16 is the flower or petal fold. The snapshot 1012 shows a portion 1024 of image 16 at the upper left-hand corner being pulled out and unfolded. The flower effect resembles a flower blooming to reveal the inner surface of the petals of the flower. This can be akin to turning image 16 inside-out. The snapshot 1014 shows the portion 1024 being pulled and unfolded even further to start to reveal another image behind image 16. The snapshot 1016 shows the flower effect progressing even further to hide even more of image 16 and revealing more of the new image 20 and associated container 1028. The snapshot 1018 shows the flower effect at near completion with the new image 20 (and associated container 1028) covering up almost all of image 16. The snapshot 1020 shows the end of the flower effect with the new image 20 revealed completely and image 18 hidden behind image 20. Additionally, the flower effect can be used to reveal more than a single image and hide more than a single image.

FIG. 10B shows the flip effect or appearance for the layout 1000. In addition to the flower effect, the layout 1000 can include additional effects or visual appearances, such as the flip. Reference numbers 1030, 1032, 1034, 1036 and 1038 encased in circles represent different snapshots taken during the flip process. The snapshot 1030 shows image 17 and associated container 1038 beginning to flip over towards image 18. Image 17 flips along an edge 1040 that is shared with image 18.

The next snapshot 1032 shows image 17 nearing a completion of the flip and covering up image 18. Once image 17 has flipped away from its original location, a new image 21 is revealed. The next snapshot 1034 shows image 17 beginning another flip towards image 19. The next snapshot 1036 shows image 17 nearing an end of the second flip and revealing a new image 23 over image 18 and a new image over image 19. The last snapshot 1038 shows the completion of the second flip to reveal the new images 21, 22 and 23.

While FIGS. 10A and 10B show the flower effect being performed before the flip, the order can be switched based on the image characteristics of the images associated with the layout 1000. In addition, while FIG. 10B shows two flips, the number of flips can be varied based on the number and locations of different images included in the layout 1000.

Figure 11:
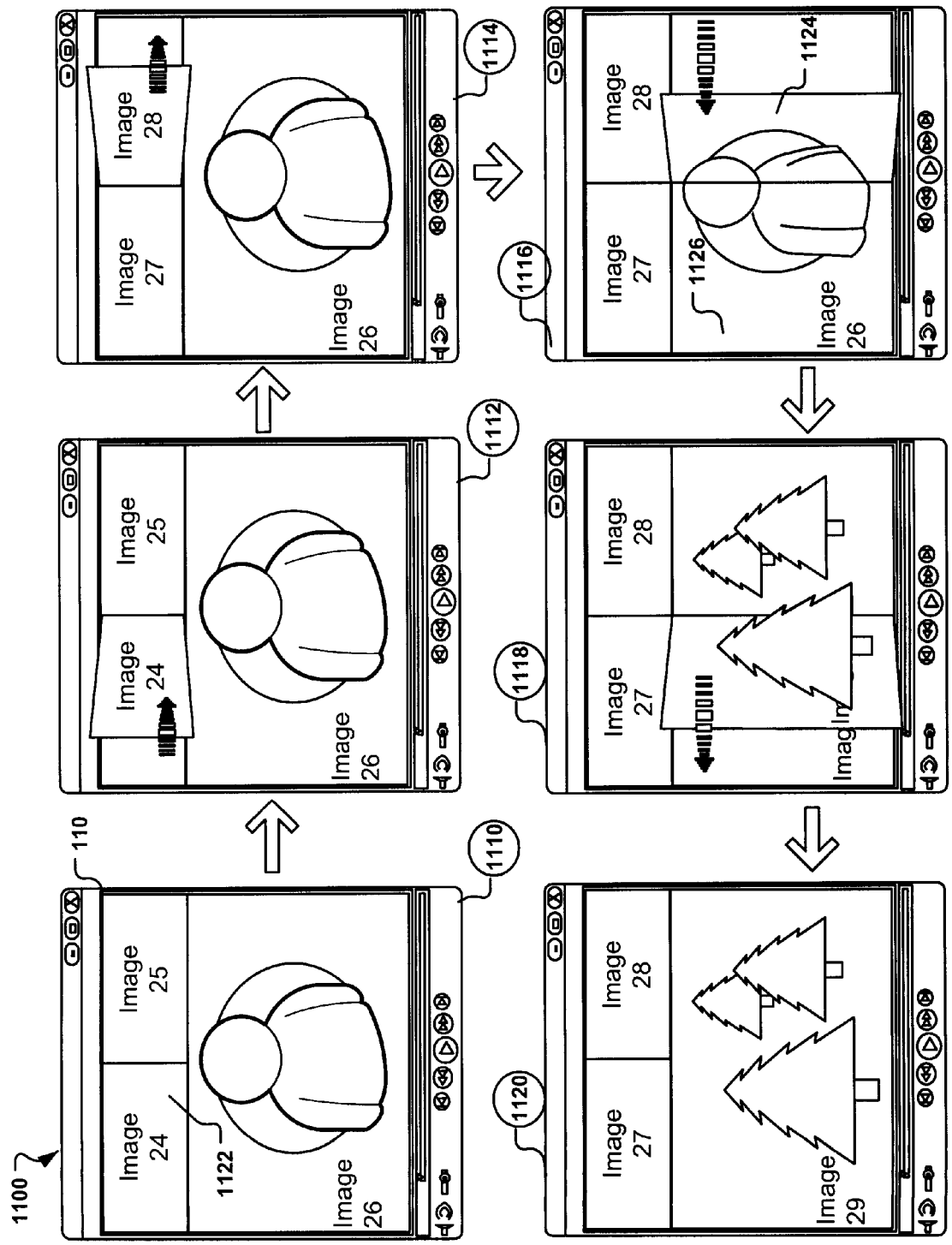
FIG. 11 shows a seventh example of a layout for displaying multiple images to provide an appearance of a 3D effect.

FIG. 11 shows a seventh example of a layout 1100 for displaying multiple images to provide an appearance of a 3D effect. The layout 1100 includes multiple flip effects. Reference numbers 1110, 1112, 1114, 1116, 1118 and 1120 encased in circles represent different snapshots during the flip effects. The snapshot 1110 shows image 24 (associated container 1122) located at an upper left-hand side of a display area 110. The display area 110 also includes images 25 and 26 (and associated containers). The next snapshot 1112 shows image 24 beginning to flip towards image 25. The next snapshot 1114 shows image 28 nearing a flip over image 25 to reveal new images 27 and 28 over images 24 and 25.

The next snapshot 1116 shows a second flip. A first portion 1124 of image 26 is beginning to flip over a second portion 1126 of image 26. The next snapshot 1118 shows the second flip at near completion to reveal a new image 29 over image 26. While FIG. 11 shows each flip revealing a single new image, more than one image can be revealed per flip. Additionally, more than one flip can be performed on a given image. For example, image 26 could be associated with two or more flips to reveal a different new image per flip over the given image.

Figure 12A:
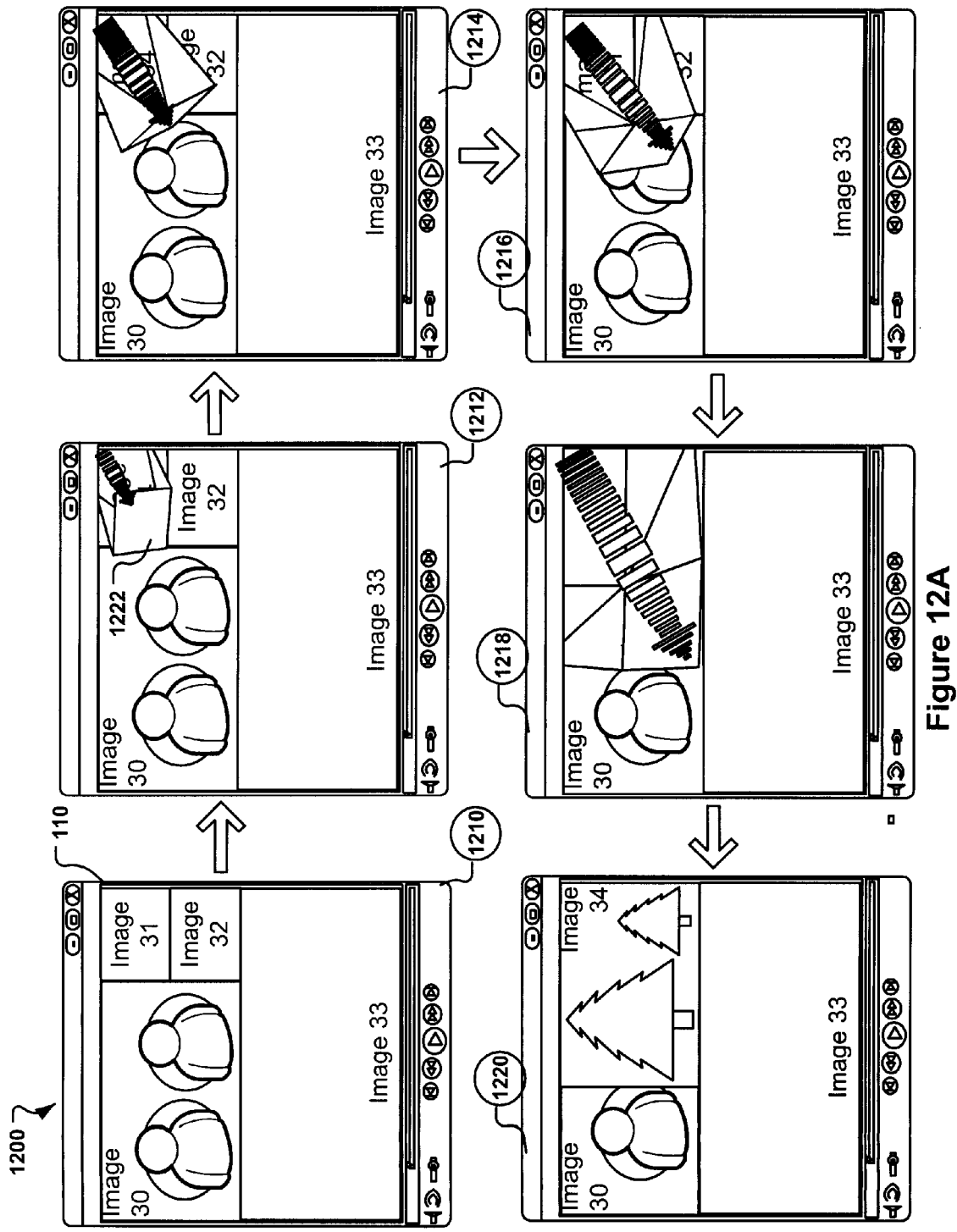
FIGS. 12A and 12B show an eighth example of a layout for displaying multiple images to provide an appearance of a 3D effect.
Figure 12B:
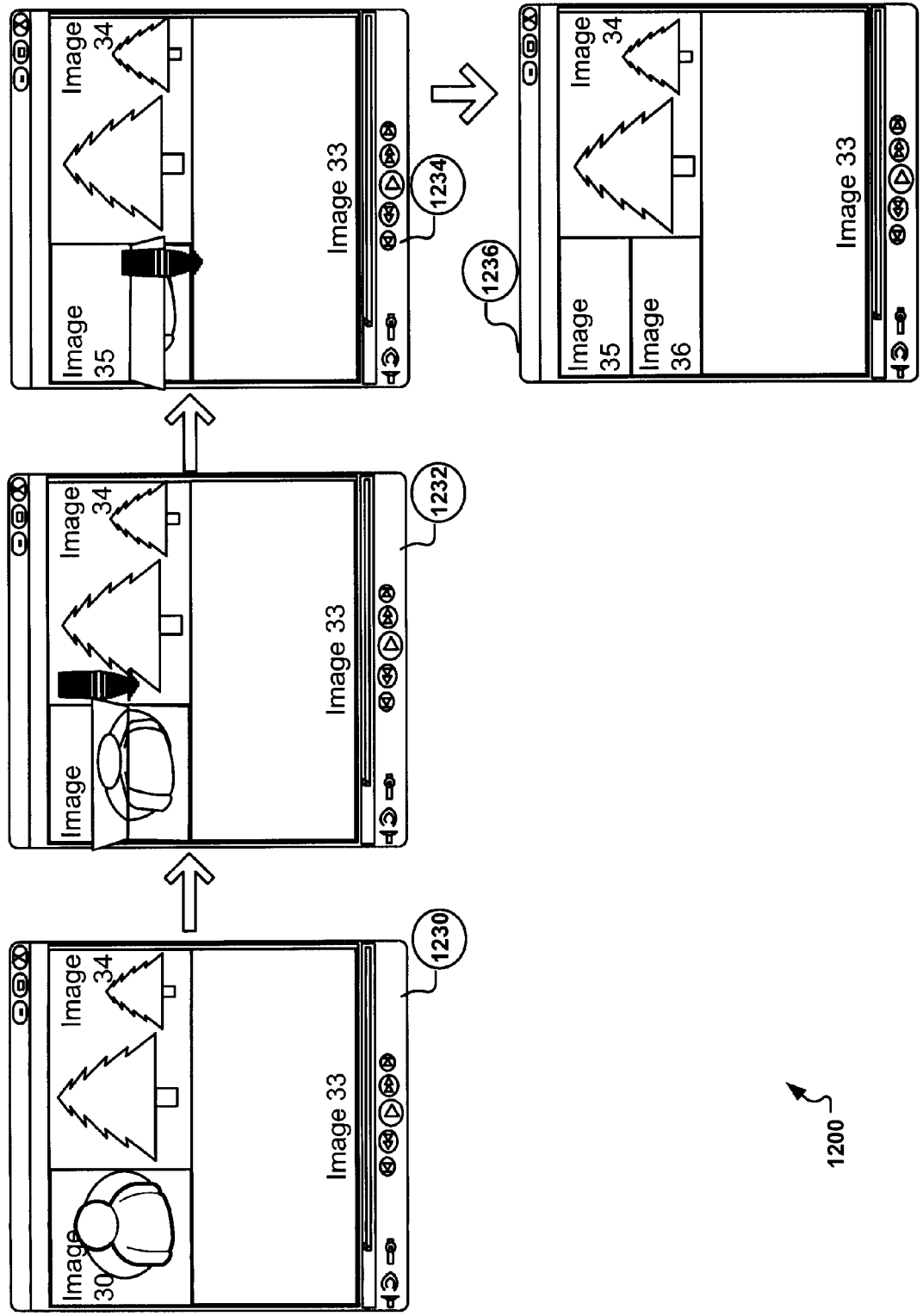

FIGS. 12A and 12B show an eighth example of a layout 1200 for displaying multiple images to provide an appearance of a 3D effect. The layout 1200 includes a flower and a flip. FIG. 12A shows the flower and FIG. 12B shows the flip. Reference numbers 1210, 1212, 1214, 1216, 1218 and 1220 encased in circles represent snapshots taken during the flower effect. The snapshot 1210 shows a display area 110 subdivided into four containers to display images 30, 31, 32 and 33. The next snapshot 1212 shows a beginning of the flower effect. A portion 1222 of image 31 at the upper right-hand corner is being pulled out and unfolded. The flower effect resembles a flower blooming to reveal the inner surface of the petals of the flower. This can be akin to turning image 31 inside-out. The snapshot 1214 shows the portion 1222 being pulled and unfolded even further to start to reveal another image behind image 31. The snapshot 1216 shows the flower effect progressing even further to hide images 31, 32 and 30 and revealing more of the new image 34 and an associated container. Images 31 and 32 are mostly covered up by the new image 34 while image 30 is partially covered up at this point.

The snapshot 1218 shows the flower effect at near completion with the new image 34 and the associated container covering up portions of image 30 and all of images 31 and 32. The snapshot 1220 shows the end of the flower effect with the new image 34 revealed completely and portions of image 30 (and all of images 31 and 32) hidden behind image 34. Additionally, the flower effect can be used to reveal more than a single image and hide more than a single image.

FIG. 12B shows a flip effect or appearance for the layout 1200. In addition to the flower effect, the layout 1200 can include additional effects or visual appearances, such as the flip. Reference numbers 1230, 1232, 1234 and 1236 encased in circles represent different snapshots taken during the flip process. The snapshot 1230 shows the partially hidden image 30 and its associated container before the flip.

The next snapshot 1232 shows the partially hidden image 30 beginning to flip over itself, along an x-axis to reveal a new image 35. The next snapshot 1234 shows the image 30 nearing a completion of the flip and covering up itself. Once image 30 has flipped away from its original location to hide itself, another new image 36 is revealed. The last snapshot 1236 shows the completion of the flip that results in the remaining portions of image 30 to be hidden and two new images 35 and 36 being revealed.

While FIGS. 12A and 12B show the flower effect being performed before the flip, the order can be switched based on the image characteristics of the images associated with the layout 1200. In addition, while FIG. 12B shows one flip, the number of flips can be varied based on the number and locations of different images (e.g., hidden images) included in the layout 1200.

Figure 13A:
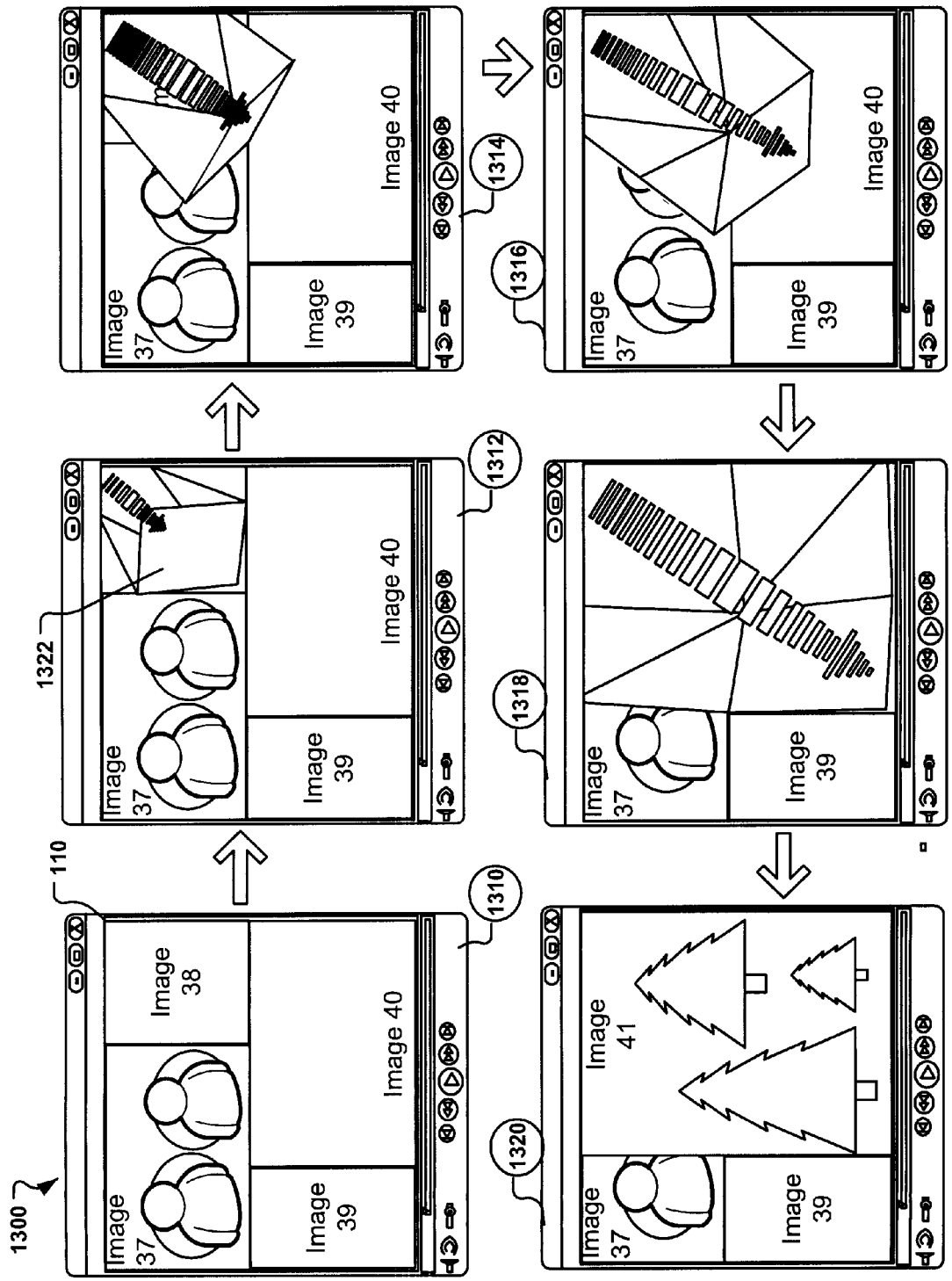
FIGS. 13A and 13B show a ninth example of a layout for displaying multiple images to provide an appearance of a 3D effect.
Figure 13B:
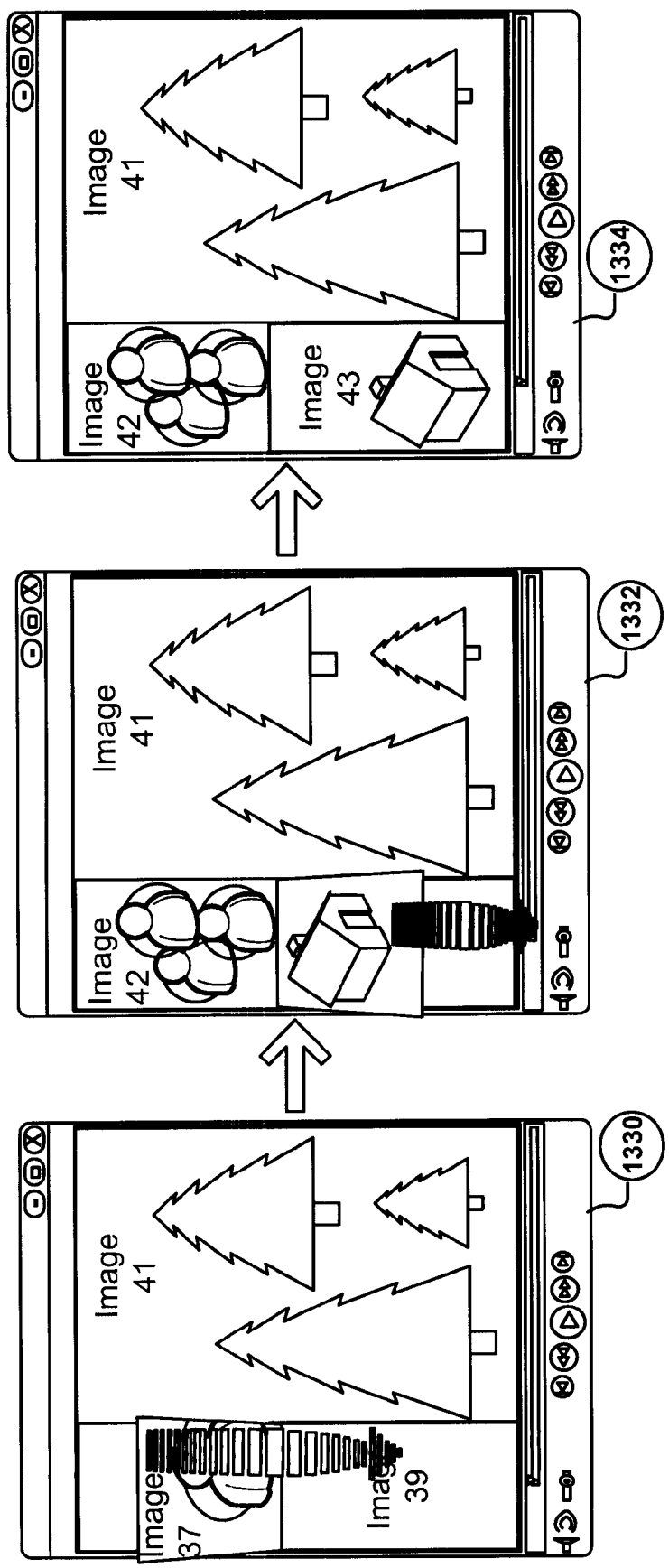

FIGS. 13A and 13B show a ninth example of a layout 1300 for displaying multiple images to provide an appearance of a 3D effect. The layout 1300 includes a flower and a flip. FIG. 13A shows the flower and FIG. 13B shows the flip. Reference numbers 1310, 1312, 1314, 1316, 1318 and 1320 encased in circles represent snapshots taken during the flower effect. The snapshot 1310 shows a display area 110 subdivided into four containers to display images 37, 38, 39 and 40. The next snapshot 1312 shows a beginning of the flower effect. A portion 1322 of image 38 at the upper right-hand corner is being pulled out and unfolded. The flower effect resembles a flower blooming to reveal the inner surface of the petals of the flower. This can be akin to turning image 38 inside-out. The next snapshot 1314 shows the portion 1322 being pulled and unfolded even further to start to reveal another image behind image 38. The next snapshot 1316 shows the flower effect progressing even further to hide images 37, 38 and 49 and revealing more of the new image 41 and an associated container. Image 38 is mostly covered up by the new image 41 while images 37 and 40 are partially covered up at this point.

The snapshot 1318 shows the flower effect at near completion with the new image 41 and the associated container covering up portions of image 37 and all of images 38 and 40. The snapshot 1220 shows the end of the flower effect with the new image 41 revealed completely and portions of image 37

(and all of images 38 and 40) hidden behind image 41. Additionally, the flower effect can be used to reveal more than a single image and hide more than a single image.

FIG. 13B shows a flip effect or appearance for the layout 1300. In addition to the flower effect, the layout 1300 can include additional effects or visual appearances, such as the flip. Reference numbers 1330, 1332, 1334 and 1336 encased in circles represent different snapshots taken during the flip process. The snapshot 1330 shows the partially hidden image 37 and its associated container beginning to flip over towards image 39, along an x-axis.

The next snapshot 1332 shows the partially hidden image 37 nearing a completion of the flip to reveal new images 42 and 43 and cover up image 39. The last snapshot 1334 shows the completion of the flip that results in the new images 42 and 43 covering up images 37 and 39.

While FIGS. 13A and 13B show the flower effect being performed before the flip, the order can be switched based on the image characteristics of the images associated with the layout 1300. In addition, while FIG. 12B shows one flip along the x-axis, the number of flips can be varied based on the number and locations of different images (e.g., hidden images) included in the layout 1300.

Figure 14A:
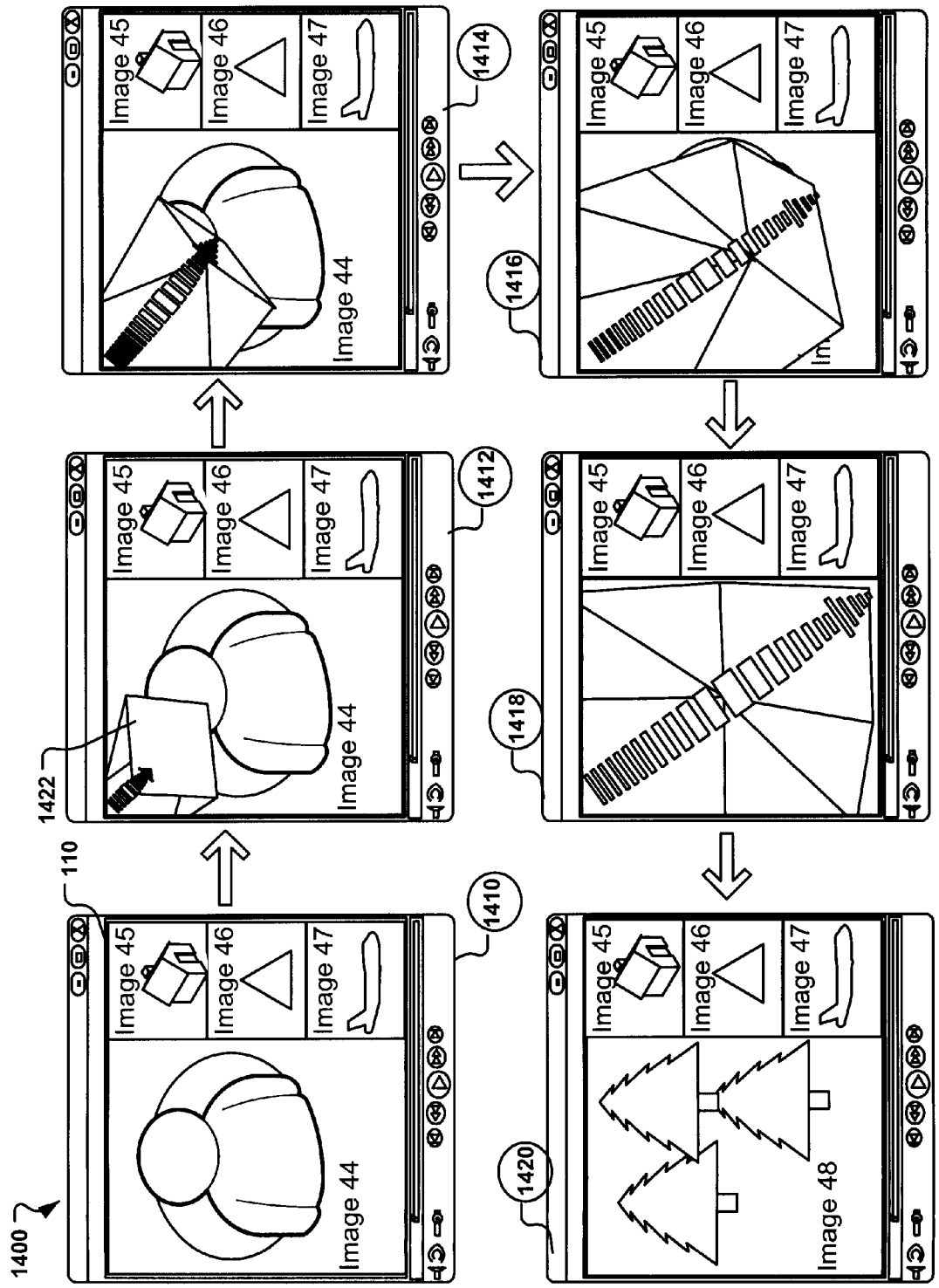
FIGS. 14A and 14B show a tenth example of a layout for displaying multiple images to provide an appearance of a 3D effect.
Figure 14B:
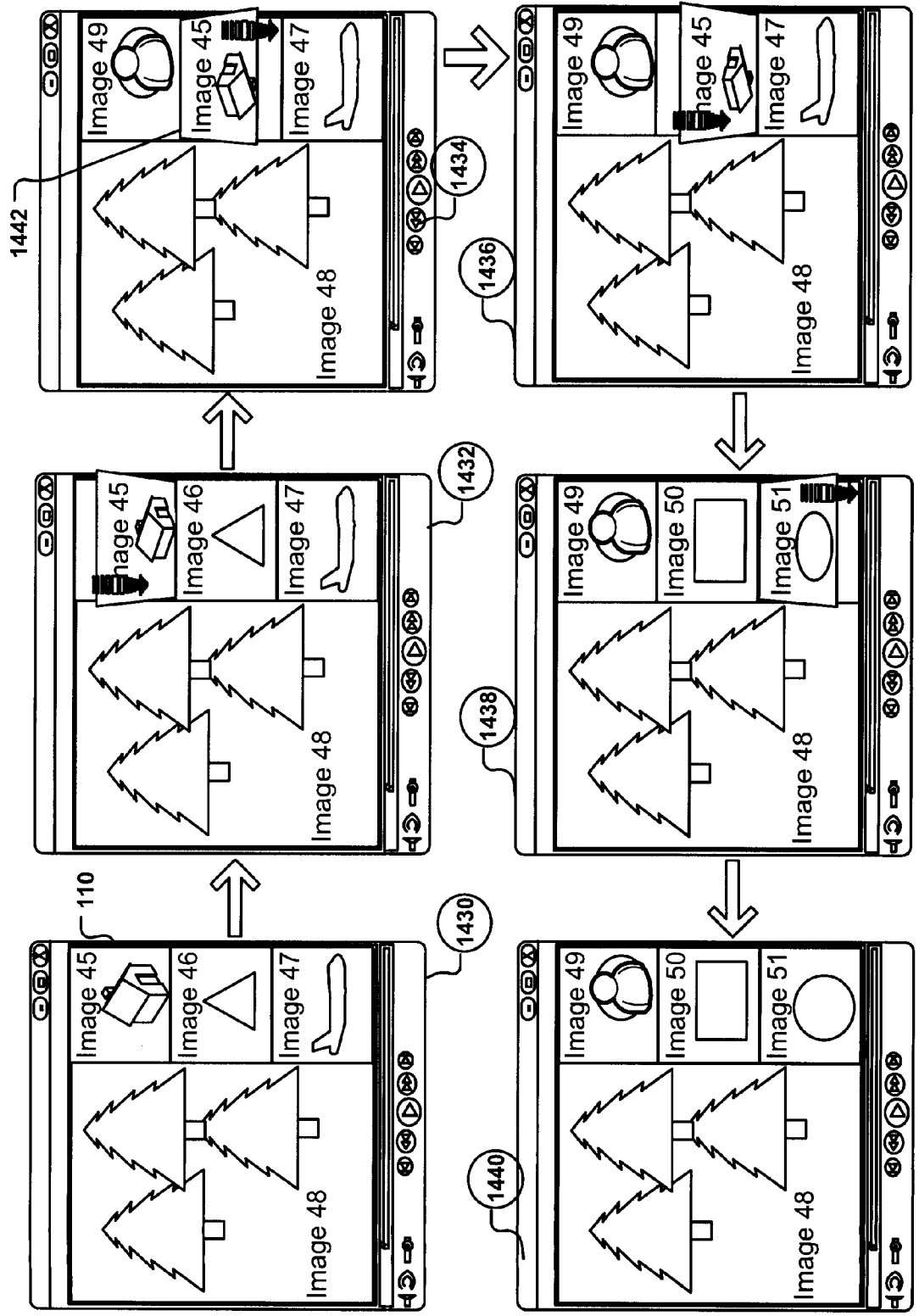

FIGS. 14A and 14B show a tenth example of a layout 1400 for displaying multiple images to provide an appearance of a 3D effect. The layout 1400 includes a flower and a flip. FIG. 14A shows the flower and FIG. 14B shows the flip. Reference numbers 1410, 1412, 1414, 1416, 1418 and 1420 encased in circles represent snapshots taken during the flower effect. The snapshot 1410 shows a display area 110 subdivided into four containers to display images 44, 45, 46 and 47. The next snapshot 1412 shows a beginning of the flower effect. A portion 1422 of image 44 at the upper left-hand corner is being pulled out and unfolded. The flower effect resembles a flower blooming to reveal the inner surface of the petals of the flower. This can be akin to turning image 44 inside-out. The next snapshot 1414 shows the portion 1422 being pulled and unfolded even further to start to reveal another image behind image 44. Also, image 44 is beginning to be covered up by the flower. The next snapshot 1416 shows the flower effect progressing even further to hide most of image 44 and reveal more of the new image 48 and an associated container.

The snapshot 1418 shows the flower effect at near completion with the new image 48 and the associated container covering up portions of image 44. The snapshot 1420 shows the end of the flower effect with the new image 48 revealed completely and image 44 hidden behind image 41. Additionally, the flower effect can be used to reveal more than a single image and hide more than a single image.

FIG. 14B shows a flip effect or appearance for the layout 1400. In addition to the flower effect, the layout 1400 can include additional effects or visual appearances, such as the flip. Reference numbers 1430, 1432, 1434 and 1436 encased in circles represent different snapshots taken during the flip process. The first snapshot 1430 shows the images 45, 46, 47 and 48 displayed on the display area 110 using four containers.

The next snapshot 1432 shows image 45 and its associated container beginning to flip over and towards image 46, along an x-axis. The next snapshot 1434 shows image 45 nearing a completion of the flip to reveal new image 49 and cover up image 45. As image 45 is nearing its flip, image 45 is displayed upside-down and right side-left to reflect an actual flip of the image 45. This flip can resemble displaying a mirrored image along the axis of rotation 1442 for the flip.

The next snapshot 1436 shows image 45 beginning a second flip towards image 47. The next snapshot 1438 shows a near completion of the second flip. As the second flip is completed, a new image 51 is revealed to begin covering up image 47. Also, another new image 50 is revealed over image 46. The last snapshot 1440 shows the completion of the second flip that results in the new images 49, 50 and 51 covering up images 45. 46 and 47.

While FIGS. 14A and 14B show the flower effect being performed before the flip, the order can be switched based on the image characteristics of the images associated with the layout 1400. While FIG. 14B shows two flips, different numbers of the flip can be implemented based on the total number and arrangement of images and associated containers (including hidden ones) included in the layout 1400. Also, while FIG. 14B shows the flip advancing from top to bottom of the display area 110, a flip can be implemented from bottom up, left to right or right to left.

Figure 15:
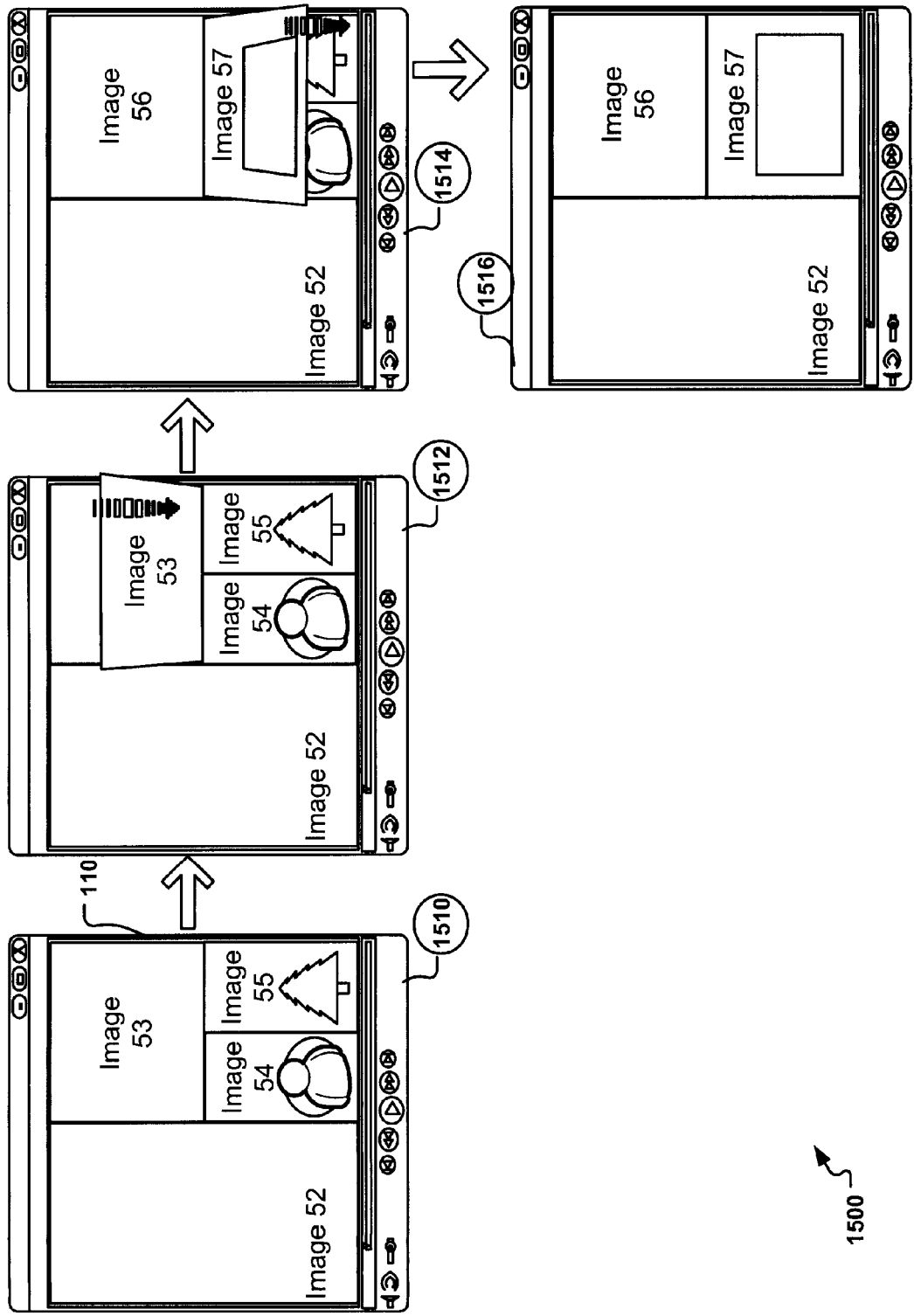
FIG. 15 shows an eleventh example of a layout for displaying multiple images to provide an appearance of a 3D effect.

FIG. 15 shows an eleventh example of a layout 1500 for displaying multiple images to provide an appearance of a 3D effect. The layout 1500 includes a flip effect. Reference numbers 1510, 1512, 1514 and 1516 represent snapshots taken during the flip effect. The snapshot 1510 shows a display area 110 divided into four containers to display images 52, 53, 54 and 56. The next snapshot 1512 shows the image 53 beginning to flip over and towards images 54 and 55 located below image 53. The next snapshot 1514 shows the image 53 nearing a completion of the flip. As the flip is completed, a new image 56 is revealed from behind image 53 and another image 57 is reveal to hide images 54 and 55. At this point, portions of images 54 and 55 are hidden by the new image 57. In the last snapshot 1516, the flip is completed and new images 56 is covering up image 53, and new image 57 is covering up images 54 and 55. As shown in FIG. 15, a flip can be implemented to cover multiple images and reveal one or more images.

Figure 16:
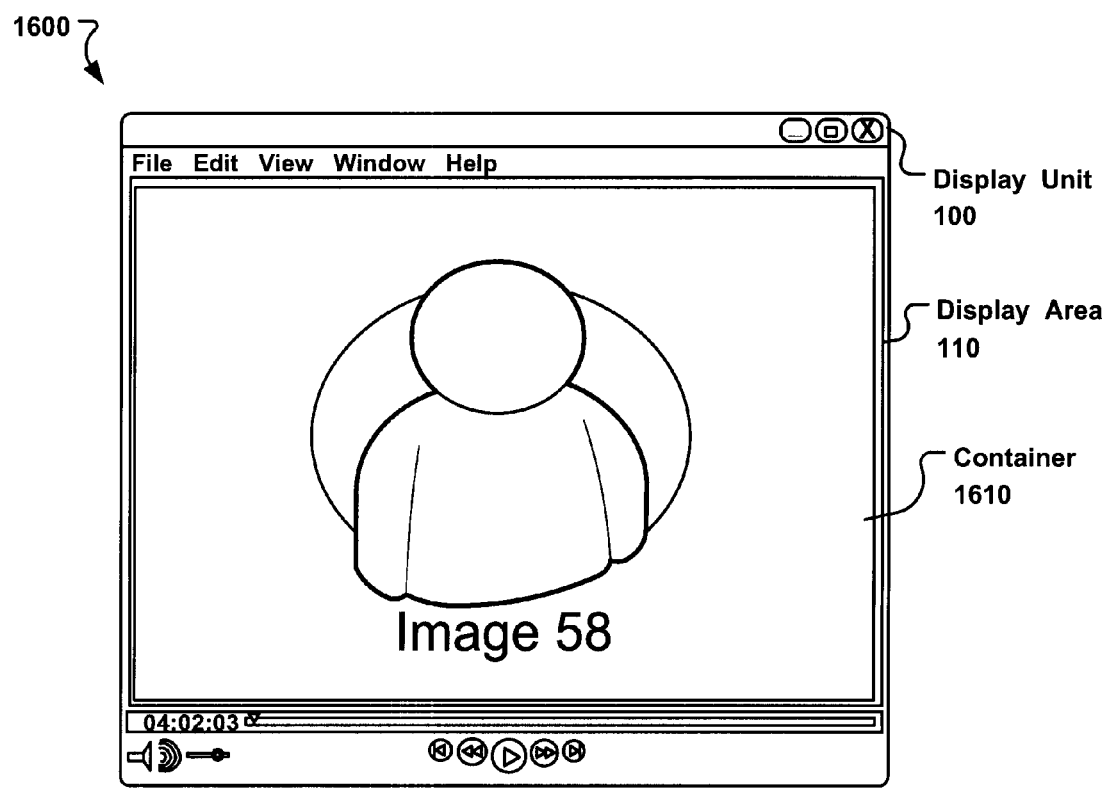
FIG. 16 shows a twelfth example of a layout for displaying multiple images to provide an appearance of a 3D effect.

FIG. 16 shows a twelfth example of a layout 1600 for displaying multiple images to provide an appearance of a 3D effect. A display unit 100 includes a display area 110, which is not subdivided. A single container 1610 is included in the display area 110 to display a single image 58. The visual appearance of image 58 and container 1610 is static, with no 3D effect. However, the available transitions described above can be used to connect to and from the layout 1600 to provide the appearance of a 3D effect.

Figure 17A:
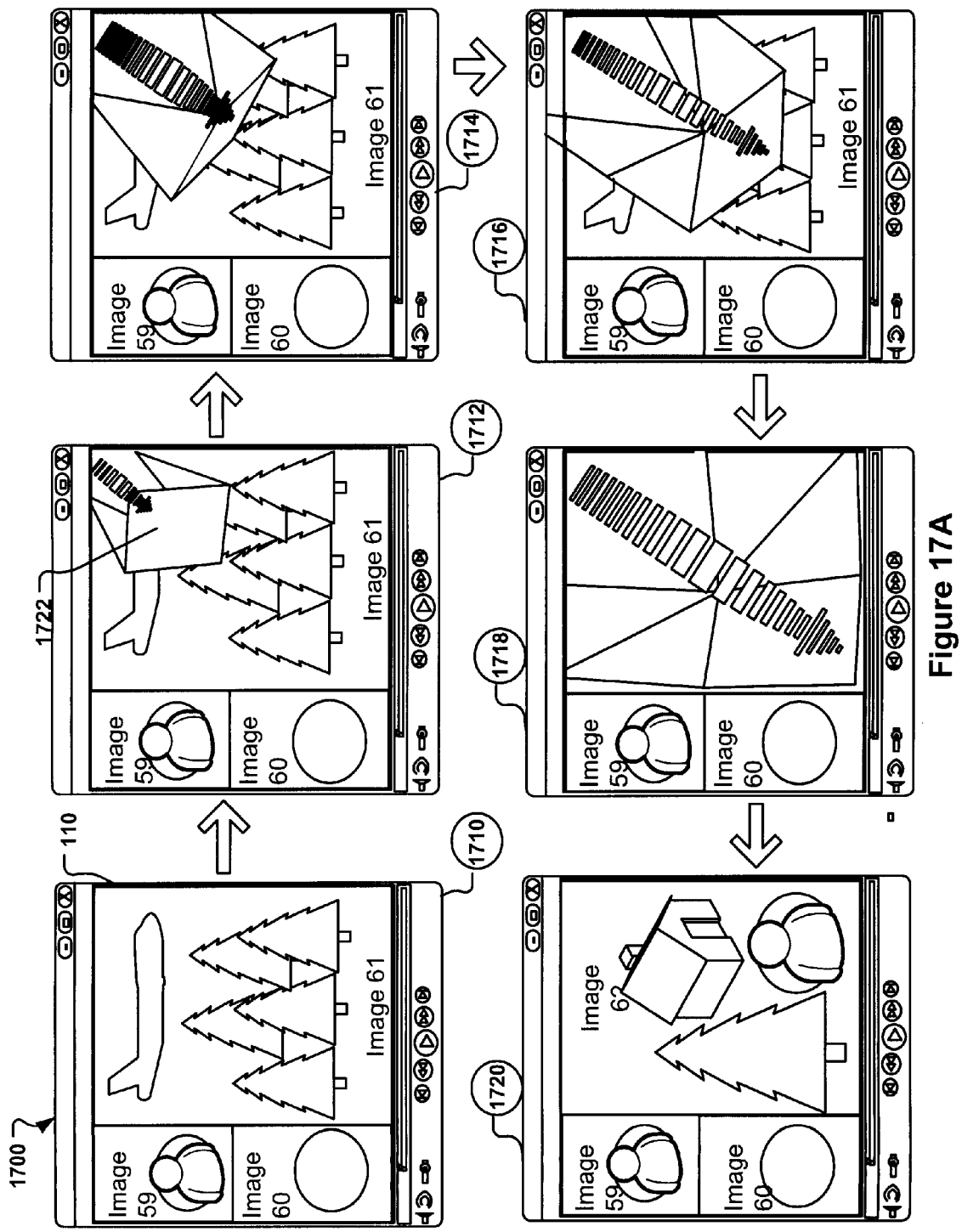
FIGS. 17A and 17B show a thirteenth example of a layout for displaying multiple images to provide an appearance of a 3D effect.
Figure 17B:
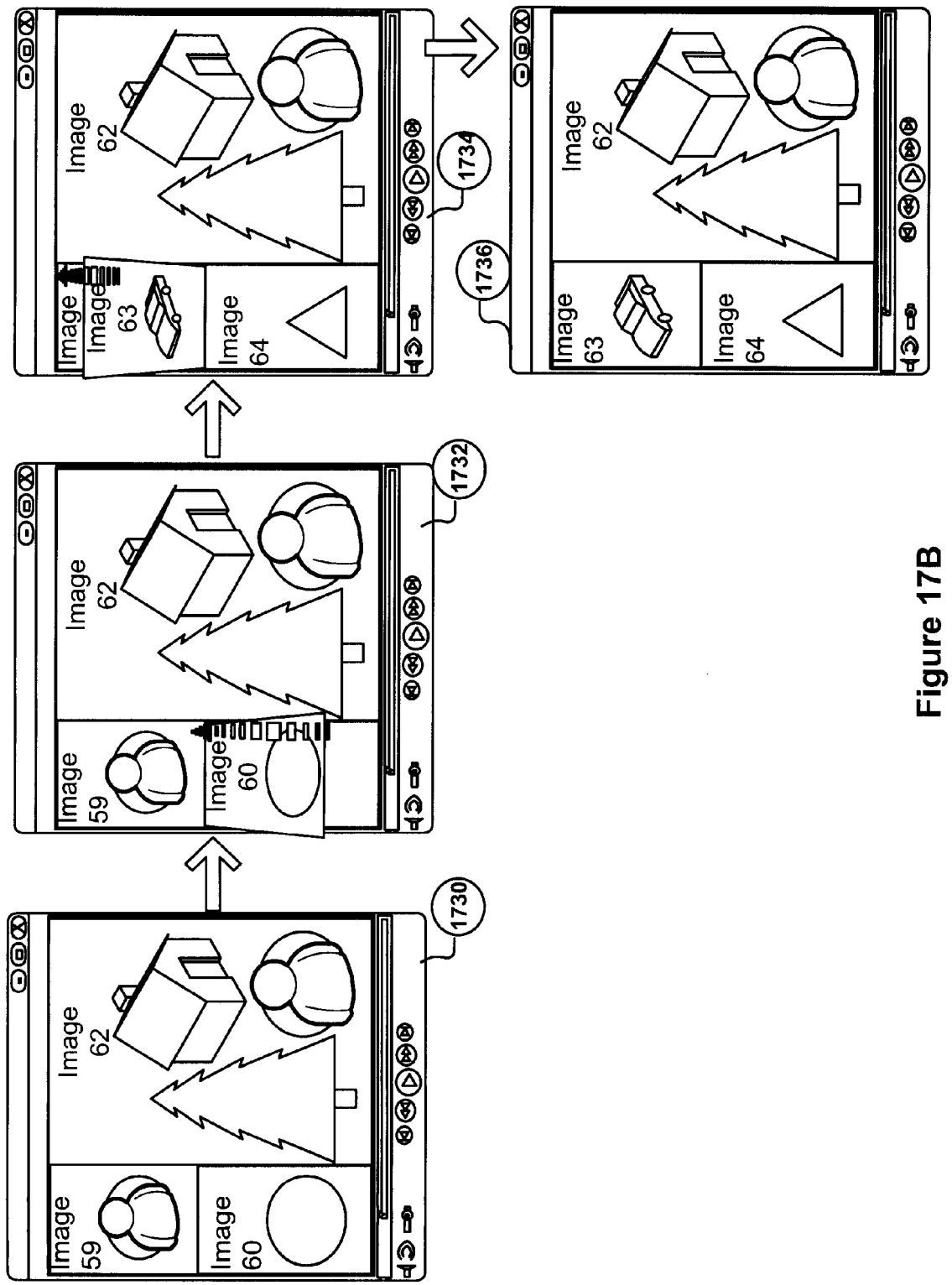

FIGS. 17A and 17B show a thirteenth example of a layout 1700 for displaying multiple images to provide an appearance of a 3D effect. The layout 1700 includes a flower and a flip. FIG. 17A shows the flower and FIG. 17B shows the flip. Reference numbers 1710, 1712, 1714, 1716, 1718 and 1720 encased in circles represent snapshots taken during the flower effect. The snapshot 1710 shows a display area 110 subdivided into three containers to display images 59, 60 and 61. The next snapshot 1712 shows a beginning of the flower effect. A portion 1722 of image 61 at the upper right-hand corner is being pulled out and unfolded. The flower effect resembles a flower blooming to reveal the inner surface of the petals of the flower. This can be akin to turning image 61 inside-out. The next snapshot 1714 shows the portion 1722 being pulled and unfolded even further to start to reveal another image behind image 61. Also, image 61 is beginning to be covered up by the flower. The next snapshot 1716 shows the flower effect progressing even further to hide more portions of image 61 and reveal more of the new image 62 and an associated container.

The snapshot 1718 shows the flower effect at near completion with the new image 62 and the associated container covering up portions of image 61. The snapshot 1720 shows the end of the flower effect with the new image 62 revealed completely and image 61 hidden behind image 62. Additionally, the flower effect can be used to reveal more than a single image and hide more than a single image.

FIG. 17B shows a flip effect or appearance for the layout 1400. In addition to the flower effect, the layout 1700 can include additional effects or visual appearances, such as the flip. Reference numbers 1730, 1732, 1734 and 1736 encased in circles represent different snapshots taken during the flip process. The first snapshot 1730 shows the images 59, 60 and 61 displayed on the display area 110 using three containers.

The next snapshot 1732 shows image 60 and its associated container beginning to flip up and towards image 59, along an x-axis. The next snapshot 1734 shows image 60 nearing a completion of the flip to reveal new images 64 and 63 to cover up images 60 and 59 respectively. The last snapshot 1736 shows the completion of the flip that results in the new images 64 and 63 covering up images 60 and 59 respectively.

While FIGS. 17A and 17B show the flower effect being performed before the flip, the order can be switched based on the image characteristics of the images associated with the layout 1700. While FIG. 17B shows one flip, different numbers of the flip can be implemented based on the total number and arrangement of images and associated containers (including hidden ones) included in the layout 1700. Also, while FIG. 17B shows the flip advancing from bottom up, a flip can be implemented from top-down, left-to-right or right-to-left.

Figure 18:
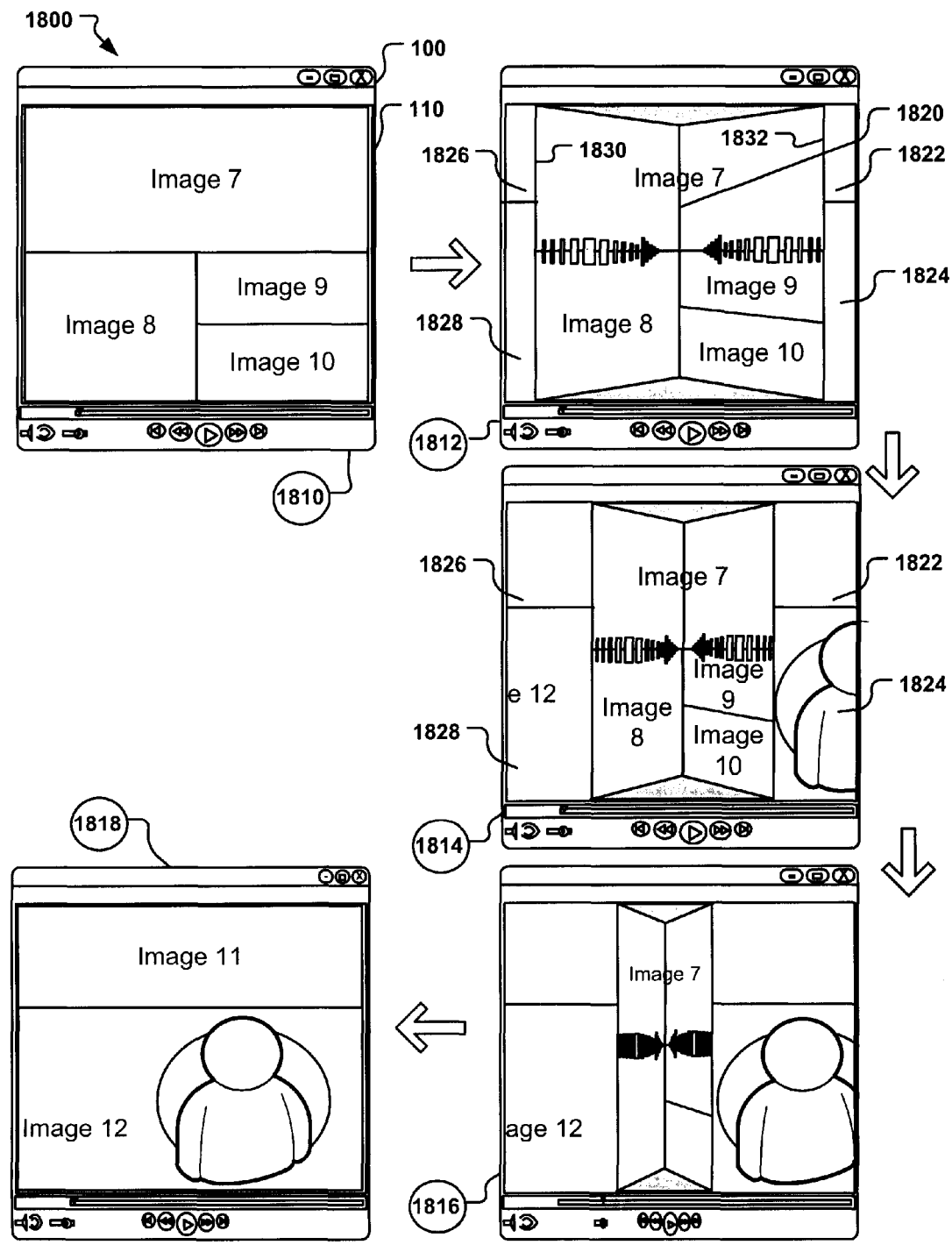
FIG. 18 shows a fold transition implemented between two layouts.
Figure 19:
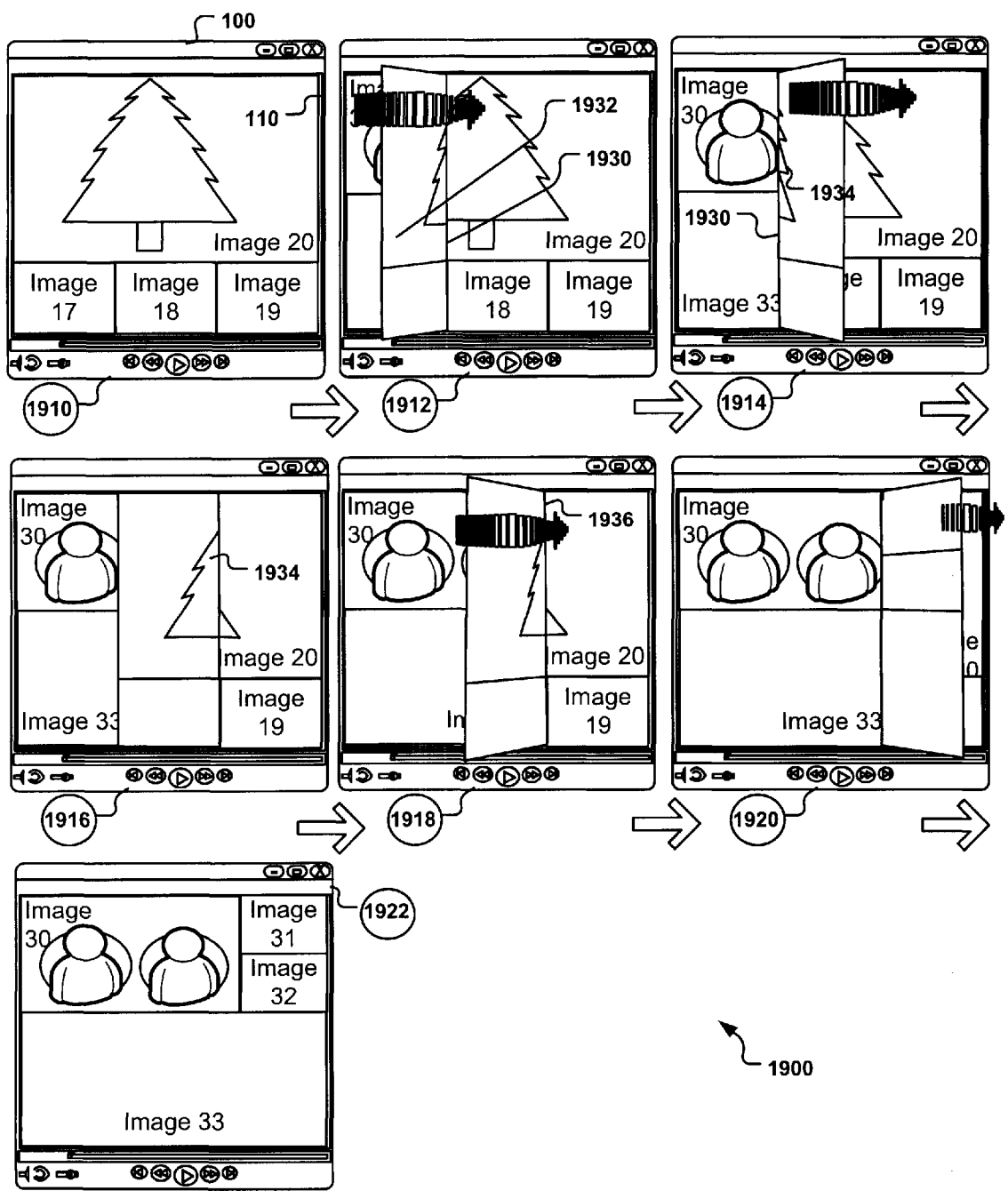
FIG. 19 shows another example of a transition between two layouts.
Figure 20:
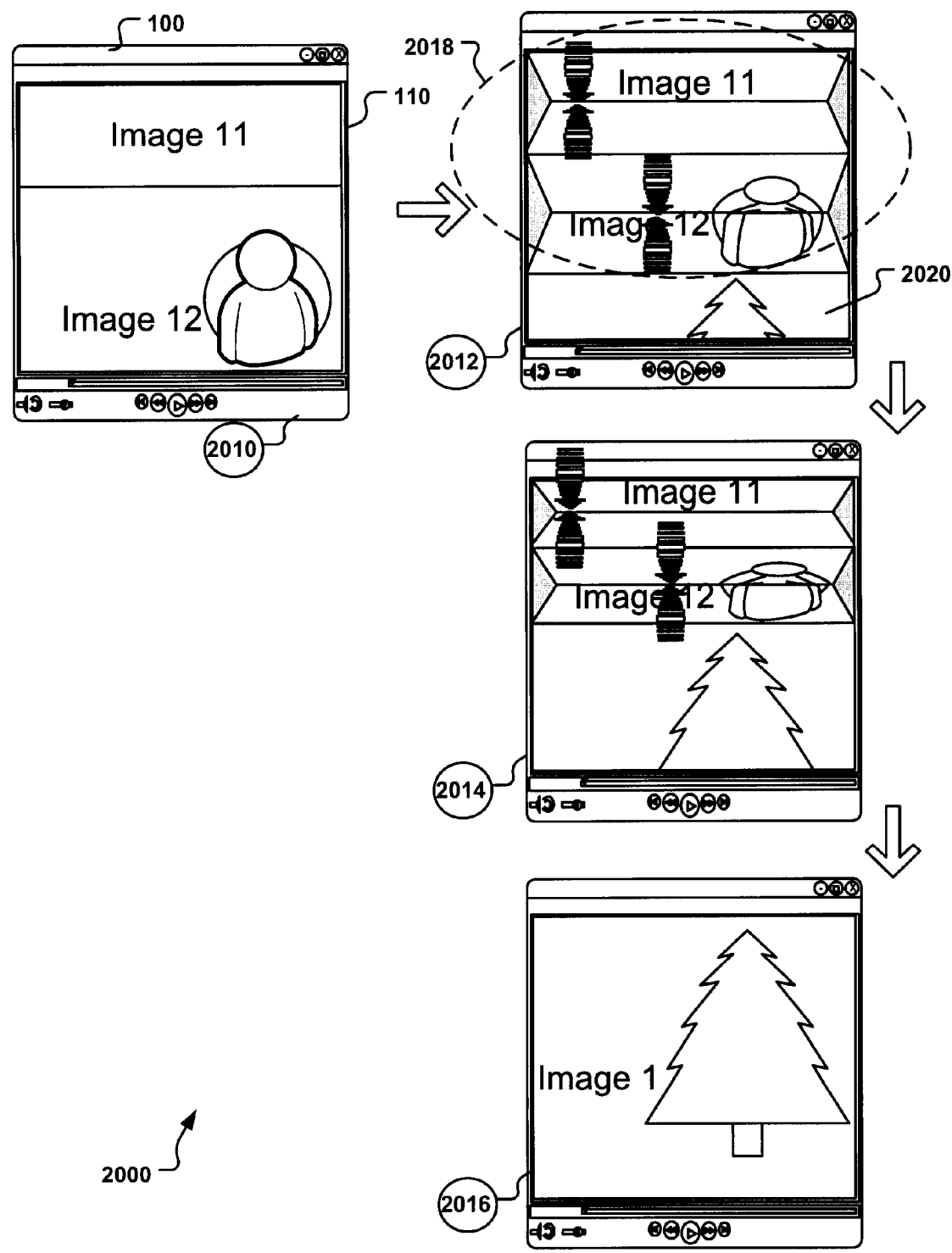
FIG. 20 shows a third example of a transition between two layouts.

FIGS. 18, 19 and 20 show different transitions that can be used to connect different layouts, such as the layouts described with respect to FIGS. 5-17B. For example, FIG. 18 shows a fold transition implemented between layout 800 and layout 900. Reference numbers 1810, 1812, 1814 and 1816 represent snapshots taken during the fold transition. The snapshot 1810 shows the static layout 800 with the display area 110 divided into four containers to display images 7, 8, 9 and 10. The next snapshot shows the images 7, 8, 9 and 10 folded into the display area 110 along a vertical line 1820. As the images 7, 8, 9 and 10 are folded into the display area 110, portions 1822, 1824, 1826 and 1828 of new images starts to appear from the left and right side of the display area 110. Additionally, the fold transition pushes the two edges 1830 and 1832 of the images 7, 8, 9 and 10 together.

The snapshot 1814 shows the fold advancing further with greater portions 1822, 1824, 1826 and 1828 of new images being revealed. Also, the folding process pushes the two edges 1830 and 1832 even closer to each other. The next snapshot 1816 shows the fold transition nearly complete with greater portions of images 7, 8, 9 and 10 folded and disappearing into the display area 110. Conversely, a greater area of 1822, 1824, 1826 and 1828 are revealed. The last snapshot 1818 shows the fold transition completed to transition from layout 800 to layout 900. The images 7, 8 9 and 10 have been folded and hidden away to reveal images 11 and 12 of the layout 900.

FIG. 19 shows another example of a transition 1900. The transition 1900 implements multiple flips to transition from layout 1000 to layout 1200. Reference numbers 1910, 1912, 1914, 1916, 1918 and 1920 represent snapshots taken during the flip transition. The snapshot 1910 shows the layout 1000 with the display area 110 divided into four containers to display images 17, 18, 19 and 20. Image 20 is located at the top of the display area 110. Images 17, 18 and 19 are located below image 20 from left-to-right in a single row. At this point, the flip transition has not started.

The next snapshot 1912 shows a beginning of a first flip with a rotation along a vertical line 1930. The line 1930 can be aligned with one of the edges of image 17 shared with image 18. A portion 1932 of image 20 and image 17 are flipped together along the line 1930. The next snapshot 1914 shows the first flip near completion. The portion 1932 of image 20 being flipped shows a mirrored or reflected image 1934 along the line 1930. Additionally, portions of new images 30 and 33 (belonging to layout 1200) are revealed. The next snapshot 1916 shows the first flip at completion. At this point, portions of images 30 and 33 are revealed, and the mirrored image portion 1934 of image 20 is covering up other parts of image 20.

The next snapshot 1918 shows a beginning of a second flip along a vertical line 1936. The mirrored image portion 1934 begins to flip towards the last remaining portion of image 20 and to cover up image 19. The next snapshot 1920 shows a near completion of the second flip during the transition. More of image 30 and 33 are revealed as the second flip is completed. The last snapshot 1922 shows the completed transition to layout 1200, which includes images 30, 31, 32 and 33.

While FIG. 19 shows two flips during the transition, the total number of flips in the transition can vary based on the number and location of each image in the layouts. Additionally, while FIG. 19 shows the two flips starting from the left and advancing to the right, other variations can be implemented. For example, the flips can be implemented right-to-left, bottom-up and top-to-bottom.

FIG. 20 shows a third example of a transition. The transition 2000 describes an accordion transition used to transition between layout 1200 and layout 500. The accordion transition includes multiple folds that can be squeezed, similar to a shape of an accordion. Reference numbers 2010, 2012, 2014 and 2016 encased in circles represent snapshots taken during the accordion transition. The snapshot 2010 shows the layout 1200 with a display area 110 of a display unit 100 divided into two containers to display images 11 and 12. At this point, the transition has not yet started.

The next snapshot 2012 shows images 11 and 12 of layout 1200 being folded and squeezed together using the accordion transition effect. The multiple folds and compression of the folded portions of images 11 and 12 are seen in reference number 2018. While images 11 and 12 are compressed together, a new image 2020 is beginning to appear. The next snapshot shows the folded portions of images 11 and 12 being compressed together even more. At the same time, more of the new image 2020 is revealed. The last snapshot 2016 shows the accordion transition at a completion. Images 11 and 12 of layout 1200 have disappeared (compressed together) and the new image 2020 is revealed in full.

While FIG. 20 shows the accordion transition implemented in a vertical direction, the accordion transition can also be implemented in a horizontal direction. The direction of the accordion effect can be based on the number and arrangement of different images associated with the two layouts being connected through the transition.

Figure 21B:
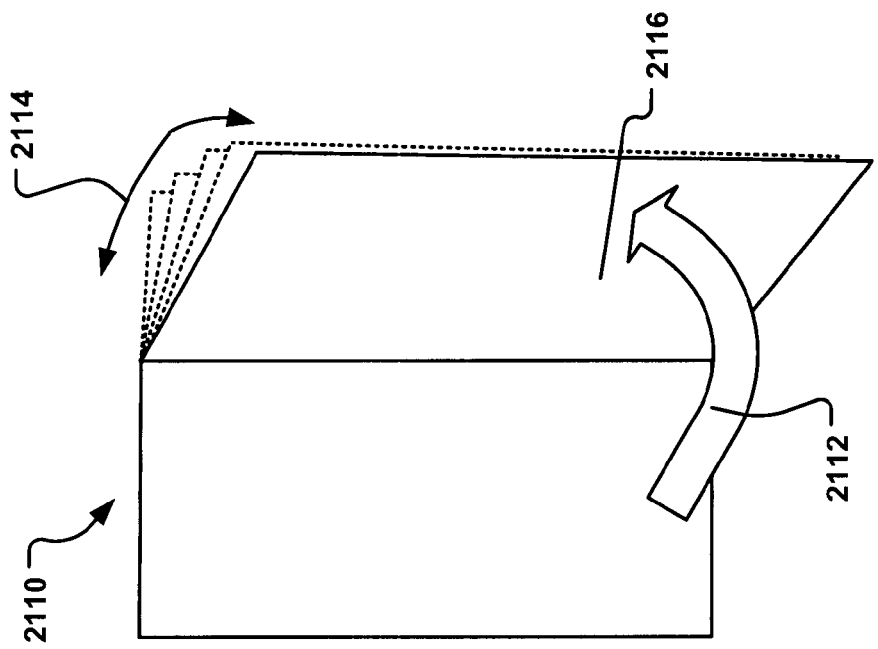
FIGS. 21A and 21B show examples of applying different damping factors for the flip effect.
Figure 21A:
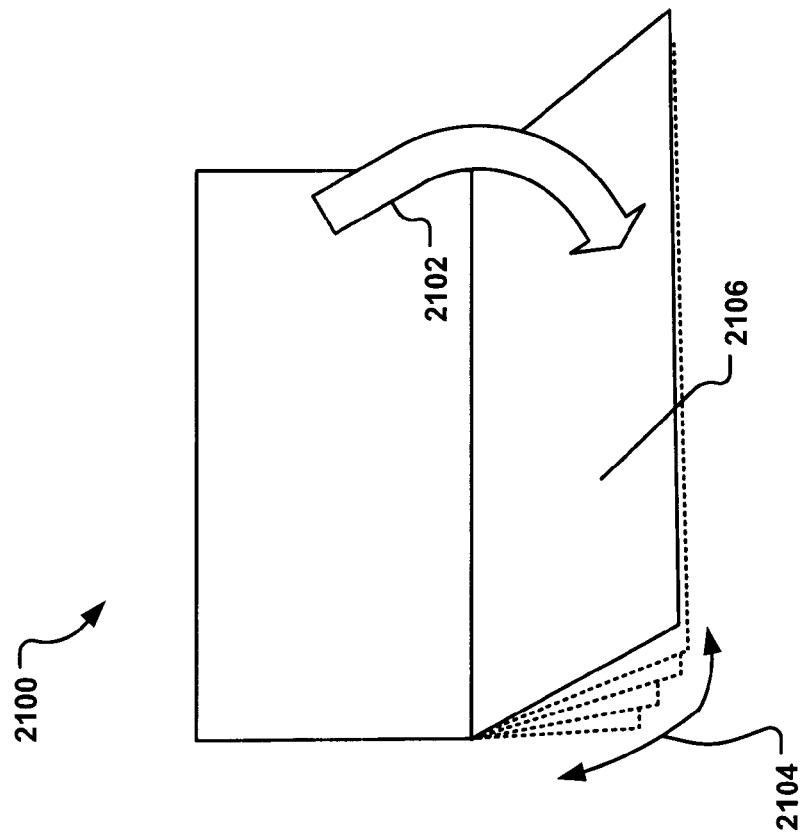

FIGS. 21A and 21B show examples of applying different damping factors for the flip effect. In FIG. 21A, a top-down flip is shown. A single headed, curved arrow 2102 shows the direction of the flip. The two headed arrow 2104 represents oscillation of an image 2106 being flipped. By adjusting the damping factor, the flipping motion can be under damped to cause the oscillation.

FIG. 21B shows a horizontal flip. A single headed, curved arrow 2112 shows the direction of the flip (e.g., from left to right). The two headed arrow 2114 represents oscillation of an image 2116 being flipped. As described above, the damping factor can be adjusted to cause the oscillation. The oscillations shown in FIGS. 21A and 21B can add to the appearance of a 3D effect.

Figure 22:
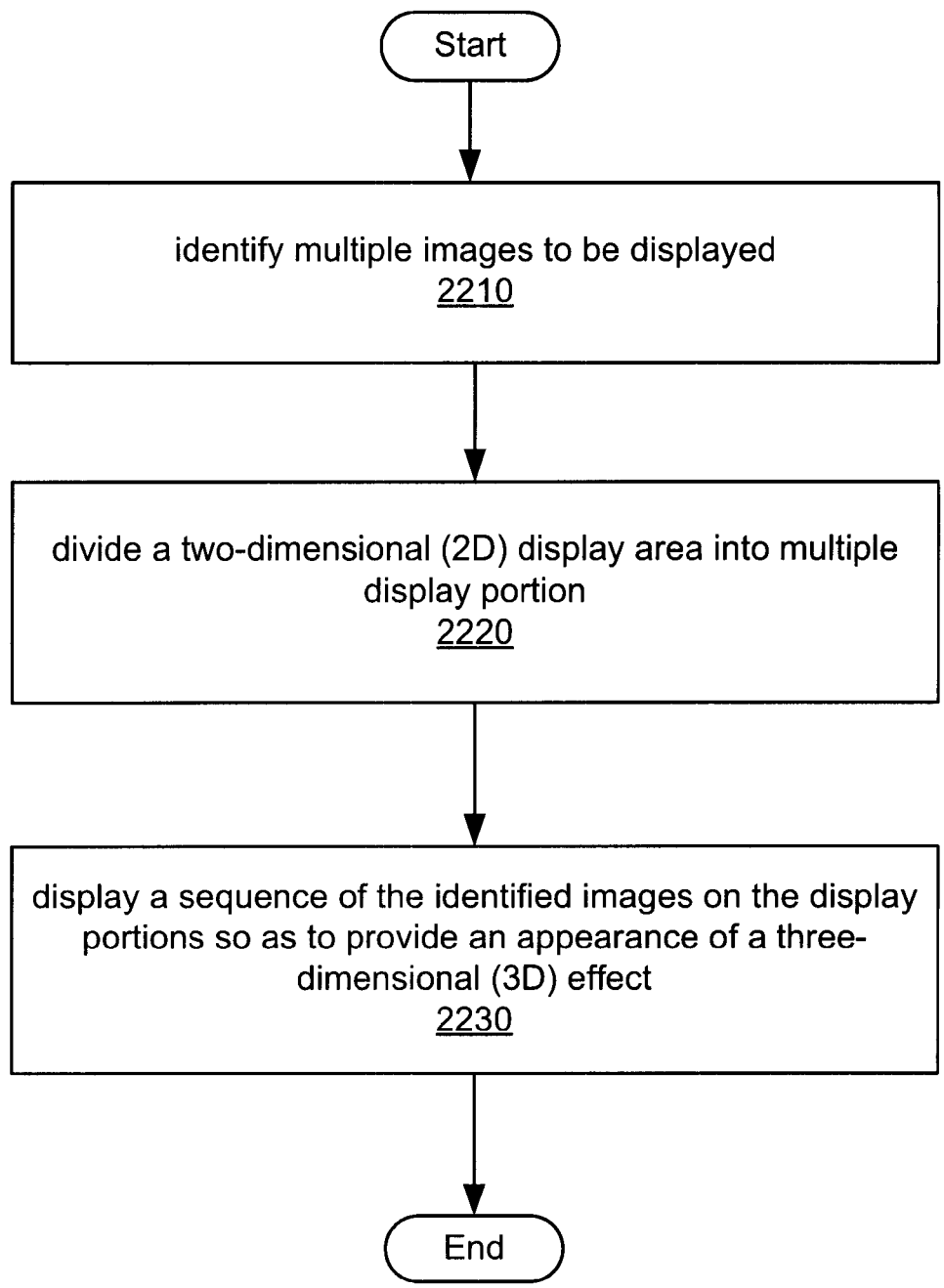
FIGS. 22-26 show process flow diagrams of exemplary processes for displaying multiple images to provide an appearance of a 3D effect.

FIGS. 22-26 show process flow diagrams of exemplary processes for displaying multiple images to provide an appearance of a 3D effect. For example, FIG. 22 shows one example of a process 2200 for displaying multiple images. A data processing device or system (e.g., device 100, 2702) can identify multiple images to be displayed (2210). The data processing device or system can divide a two-dimensional (2D) display area into multiple display portions (2220). The data processing device or system can display a sequence of the identified images on the display portions so as to provide an appearance of a three-dimensional (3D) effect (2230).

Displaying the identified images can include manipulating the display portions to cause at least one of the identified images to appear to move in 3D space. Examples of the appearance of a three-dimensional (3D) effect can include folding an image, flipping or rotating an image, applying a petal fold or flowering effect to an image or a combination of folding, flipping and flowering applied to one of the identified images. The different 3D appearances are described with respect to FIGS. 1A-21B above.

Additionally, the system or data processing device can arrange the display portions on the 2D display area based on a display layout. The display layout can be selected based on at least one image characteristic of the identified images. Examples of the at least one image characteristic can include an aspect ratio of images or detected faces of people on the images.

Also, in displaying a sequence of the identified images, the data processing device or system can display a first sequence of a first subset of the identified images followed by a second sequence of a second subset of the identified images on the display portions so as to provide an appearance of a three-dimensional (3D) effect. To provide a seamless transition between the different sequences, a transition between the first subset and the second subset can be implemented.

Figure 23:
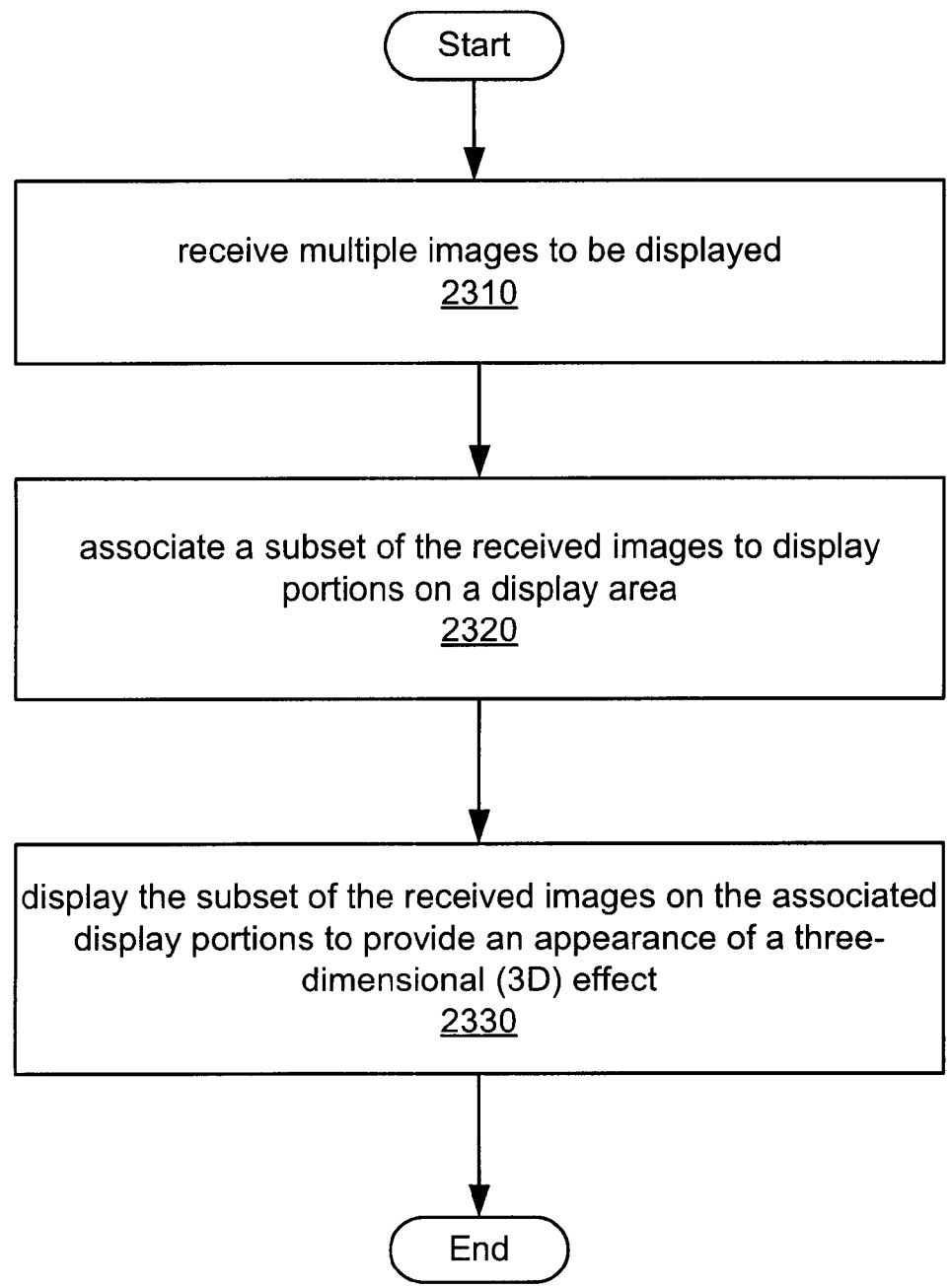

FIG. 23 shows a process flow diagram of a second example of a process 2300 for displaying multiple images. A data processing device or system can receive multiple images to be displayed (2310). The data processing device can associate a subset of the received images to display portions on a display area (2320). The data processing device can display the subset of the received images on the associated display portions to provide an appearance of a three-dimensional (3D) effect (2330). Displaying the subset can include manipulating the associated display portions to mask at least one image from the subset with at least one other image from the subset. Also, displaying the subset of the received images can include manipulating the associated display portions to move a given image from the subset from one display portion to another to reveal a previously undisplayed image from the subset.

Figure 24:
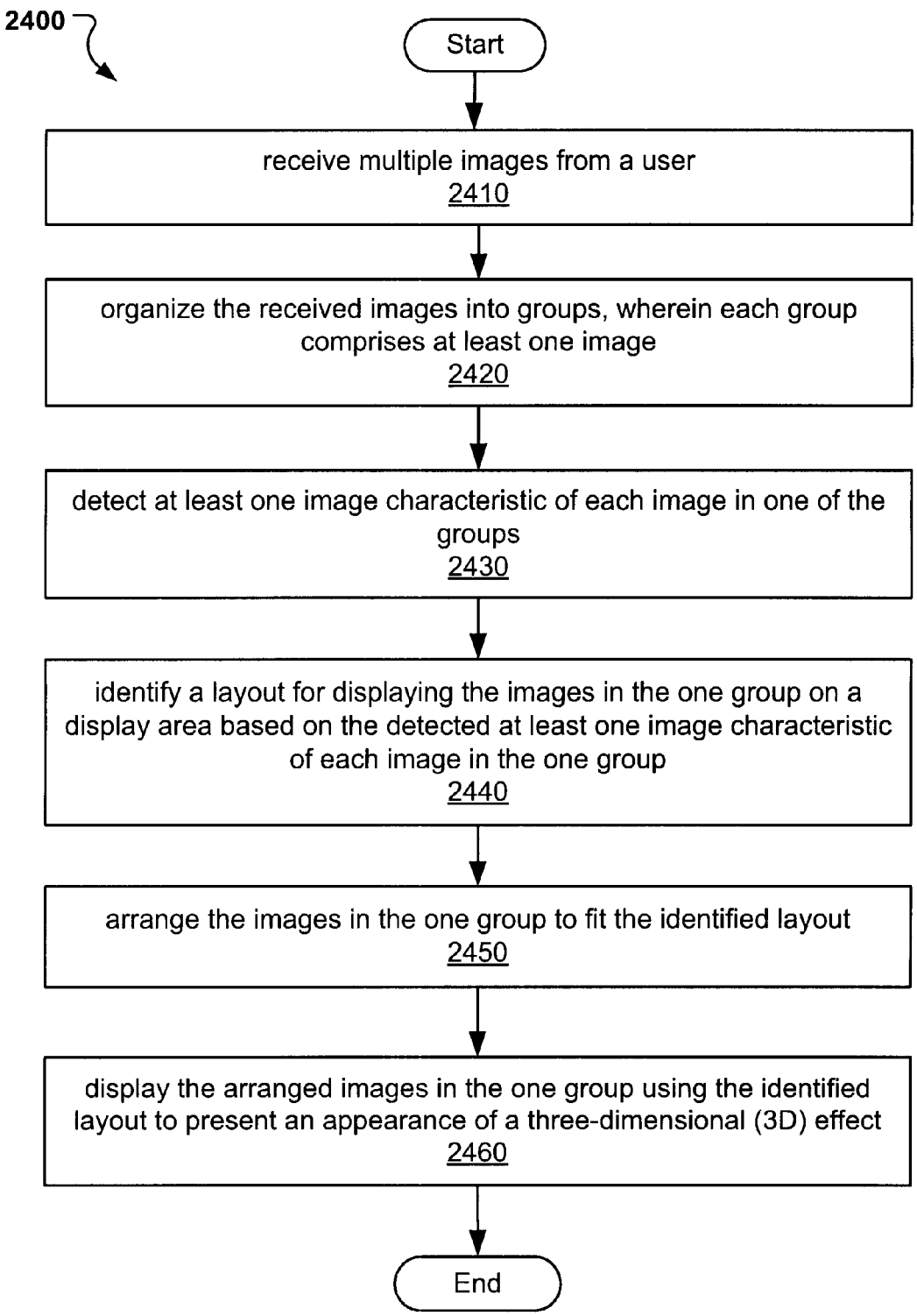

FIG. 24 shows a process flow diagram of a third example of a process 2400 for displaying multiple images. A data processing device or system can receive multiple images from a user (2410). The data processing device or system can organize the received images into groups, wherein each group comprises at least one image (2420). The data processing device can detect at least one image characteristic of each image in one of the groups (2430). The data processing device or system can identify a layout for displaying the images in the one group on a display area based on the detected at least one image characteristic of each image in the one group (2440). Examples of the image characteristics can include an aspect ratio of each image and detected faces of persons in each image. The data processing device or system can arrange the images in the one group to fit the identified layout (2450). Additionally, the data processing device can display the arranged images in the one group using the identified layout to present an appearance of a three-dimensional (3D) effect (2460).

In addition, the data processing device or system can detect at least one image characteristic of each image in another one of the groups; identify a layout for the other group; arrange the images in the other group to fit the layout identified for the other group; and display the arranged images in the other group using the layout identified for the other group. To smooth transition between the groups, the data processing device can display a transition between displaying the two groups. Displaying the transition can provide an appearance of a 3D effect. Displaying the transition can include manipulating the display area to replace the one group of images with the other group of images a portion at a time.

Figure 25:
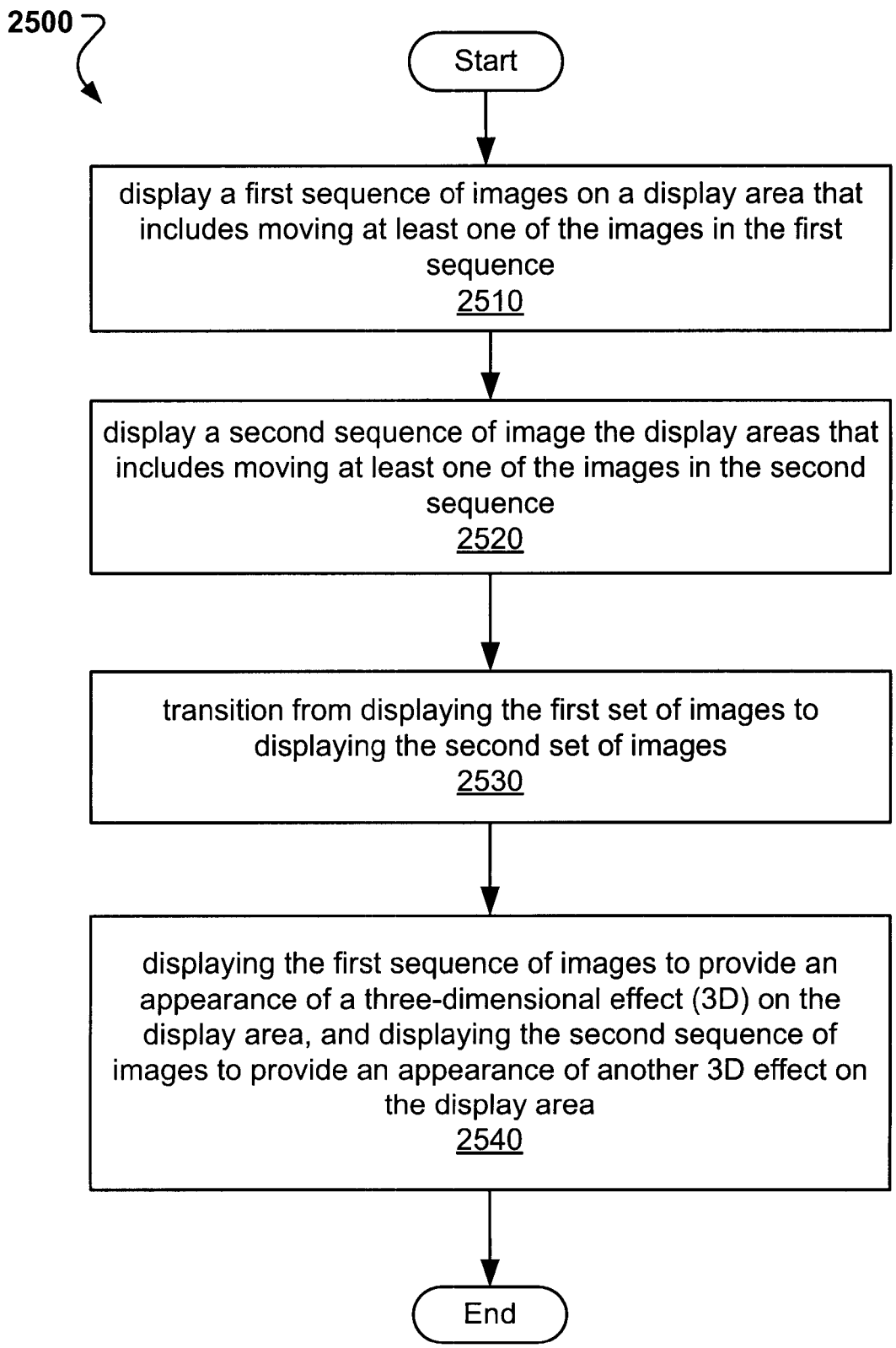

FIG. 25 shows a process flow diagram of a fourth example of a process 2500 for displaying multiple images. A data processing device or system can display a first sequence of images on a display area that includes moving at least one of the images in the first sequence (2510). The data processing device or system can display a second sequence of image the display areas that includes moving at least one of the images in the second sequence (2520). The data processing device can transition from displaying the first set of images to displaying the second set of images (2530). Displaying the first sequence of images can provide an appearance of a three-dimensional effect (3D) on the display area, and displaying the second sequence of images provide an appearance of another 3D effect on the display area (2540).

Displaying the first sequence of images can include displaying on the display area, a given image from the first sequence of images; and moving at least a portion of the displayed given image to reveal an underlying image not yet displayed from the first sequence. Displaying the first sequence of images can include displaying on the display area, a first image and a second image from the first sequence of images; and moving at least a portion of the displayed first image to mask at least a portion of the displayed second image.

Moving at least one of the images in the first sequence can include folding at least one of the images in the first sequence horizontally or vertically to display an underlying image not yet displayed from the first sequence; swinging at least one of the images in the first sequence from an edge of the at least one image; or rotating at least one of the images in the first sequence from an edge of the at least one image to mask at least one other image in the first sequence; or a combination therein.

Figure 26:
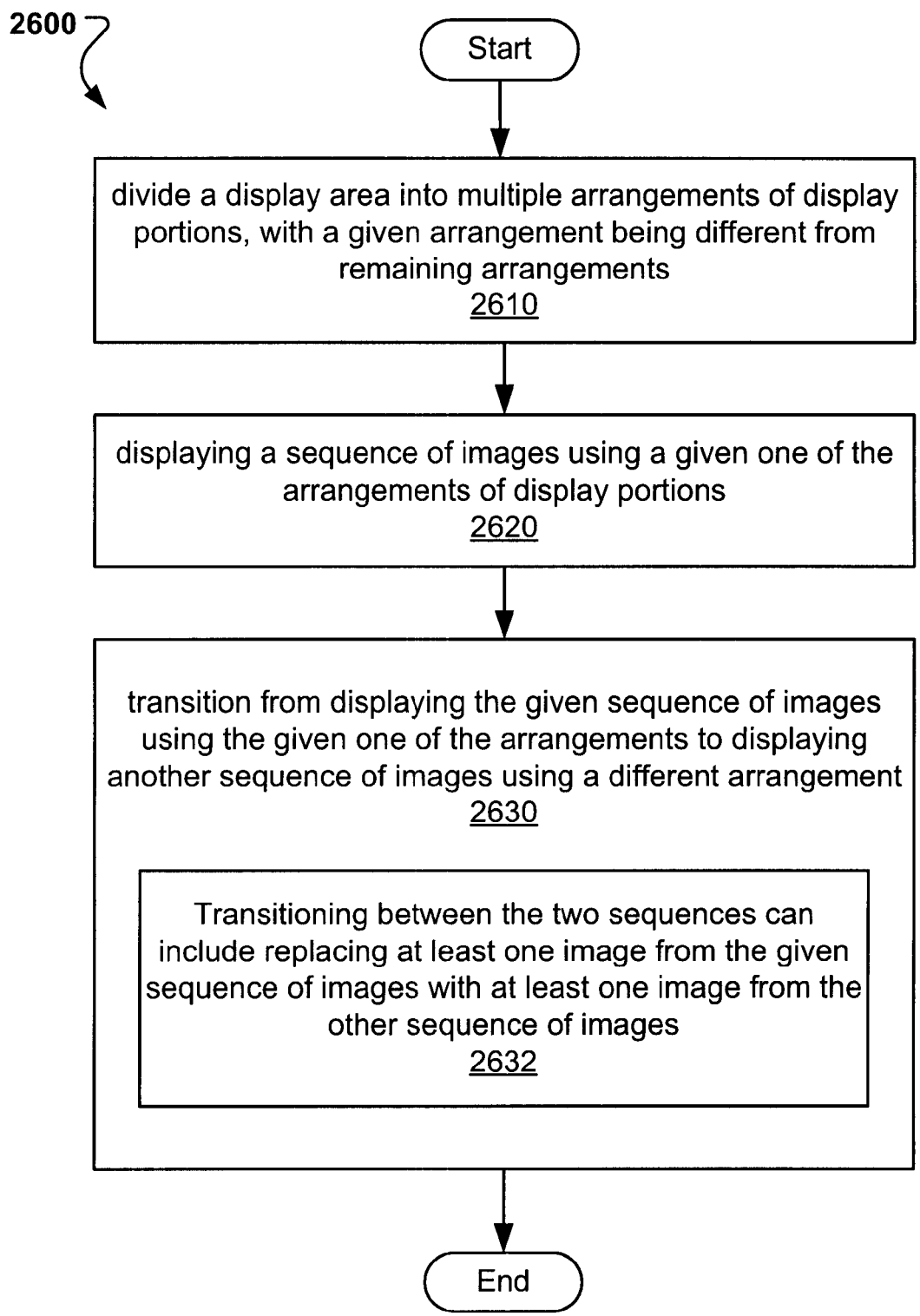

FIG. 26 shows a process flow diagram of a fifth example of a process 2600 for displaying multiple images. A data processing device or system can divide a display area into multiple arrangements of display portions, with a given arrangement being different from remaining arrangements (2610). The data processing device or system can displaying a sequence of images using a given one of the arrangements of display portions (2620). The data processing device or system can transition from displaying the given sequence of images using the given one of the arrangements to displaying another sequence of images using a different arrangement (2630). Transitioning between the two sequences can include replacing at least one image from the given sequence of images with at least one image from the other sequence of images (2632). The displaying and transitioning can provide an appearance of a three-dimensional (3D) effect.

Replacing at least one image from the given sequence can include folding at least one image from the given sequence of images to display at least one underlying image from the other sequence of images. Replacing at least one image form the given sequence can include rotating at least one image from the given sequence with respect to an edge of the at least one image to mask at least one other image from the given sequence and display at least one underlying image from the other sequence of images.

Figures 27A, 27B:
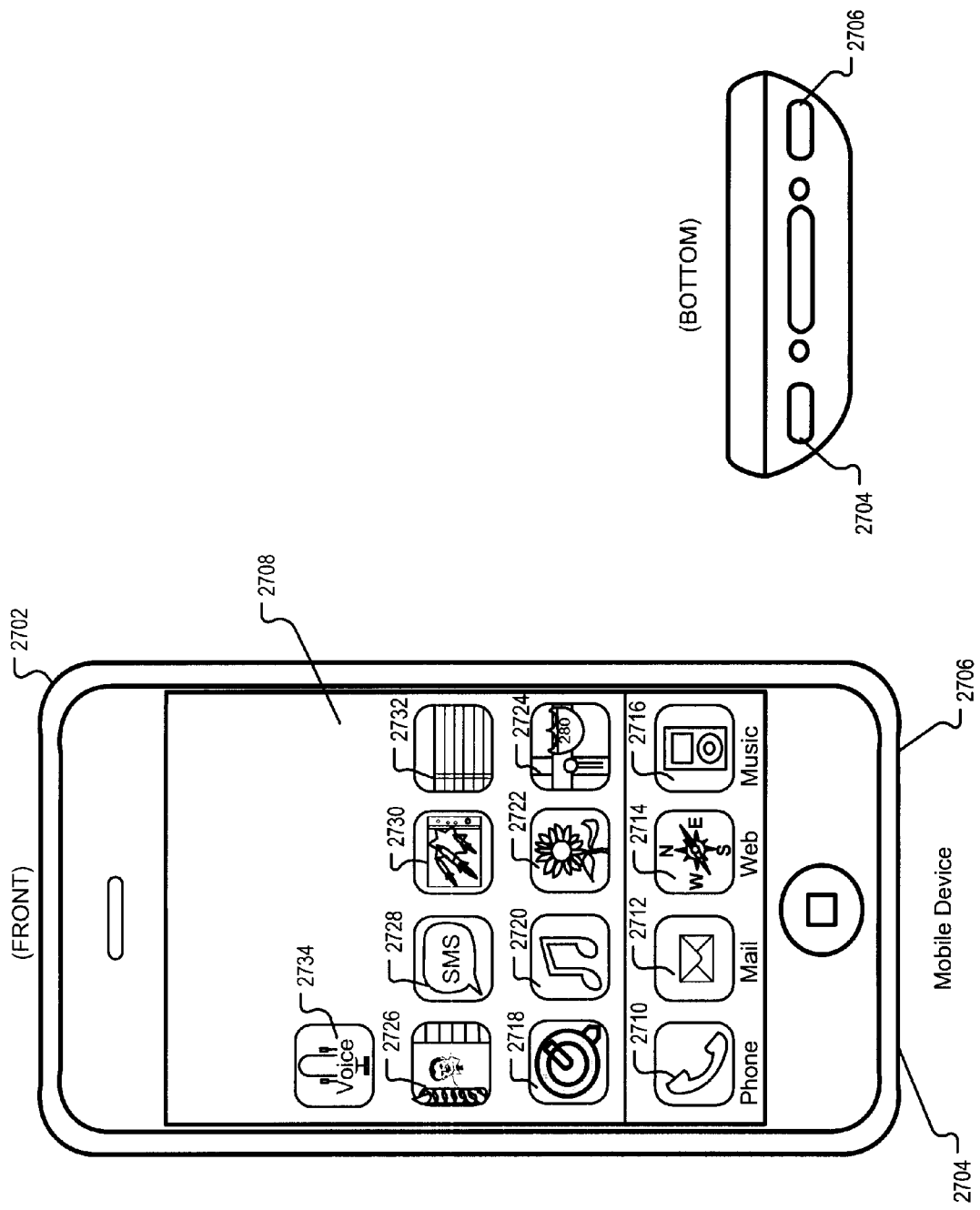
FIGS. 27A and 27B show front and bottom views of a device for displaying multiple images to provide an appearance of a 3D effect.

FIGS. 27A and 27B show front and bottom views of a device 2702 for displaying multiple images to provide an appearance of a 3D effect. The data processing device 2702 can be any device, such as a mobile device, with the ability to receive, process and display input images. The data processing device 2702 can include communication technology (e.g., wireless technology) for sharing information with other devices. The data processing device 2702 can include a variety of integrated user interface units or can be coupled to user interface units through one or more communication ports or data links of the device. Some examples of the user interface units include but are not limited to a voice input unit, such as a microphone 2706. Some examples of the user interface units include but are not limited to physical input units, such a keyboard, a mouse, a track ball, a rotary dial or wheel, a touchpad, or a touch-screen. Some examples of the user interface units include but are not limited to motion sensors, such as an accelerometer, magnetometer, or a gyroscope. Any of these user interface units can be implemented as an external unit that communicates with the data processing device 2702 to provide user input using a wired or wireless communication technology. Examples of wired communication technology include Universal Serial Bus (USB) interface, FireWire interface, etc. Examples of wireless communication technology include Bluetooth, Wi-Fi, WiMax, infrared, etc. Through these user interface units, the data processing device 2702 can receive physical or voice inputs from the user.

The data processing device 2702 can include output units to present visual and audio information to a user. Some examples of the output units include but are not limited to a display unit 2708 and a speaker 2704. FIGS. 27A and 27B show the data processing device 2702 as a mobile device for illustrative purposes, but the data processing device 2702 can include other types of devices such as a mobile phone a personal digital assistant, a portable computer, and a desktop computer.

Additionally, FIG. 27A can include data items, such as icons displayed on the display unit 2708 of the data processing device 2702. Each icon can represent a corresponding application available to be performed on the data processing device 2702. Some examples of the available icons and associated applications can include but are not limited to: a phone application icon 2710, an email application icon 2712, a Web browser application icon 2714, a music player application icon 2716, a media player application icon 2718, a music download application icon 2720, an image processing application icon 2722, a geopositioning (e.g., GPS, Wi-Fi based positioning, cellular triangulation) application icon 2724, a contacts application icon 2726, a short message service (SMS) application icon 2728, a video game application icon 2730, a text processing application 2732 icon, and a voice command icon 2734. Also, the available applications can be presented to the user using audible data items, such as recorded sounds associated with the available applications. The recorded sounds can be user recognizable speech, such as the names of the applications or simple sounds, such as a beep, a tone, a chime, etc.

A physical input unit (e.g., a touch screen, mouse, touchpad, etc.) can be used to receive physical inputs, such as positional information with respect to a visual screen displayed on an output unit (e.g., an output unit 2708) of the data processing device 2702. Some physical input units, (e.g., a button) can be used to receive non-positional information, such as user selection or confirmation. For example, the user can use a mouse to execute various point-and-click functions on the displayed screen. Also, a user can use a touch screen to perform the same functions on the displayed screen. Some user interface units, such as the keyboard, can provide textual inputs in addition to physical inputs.

Figure 28:
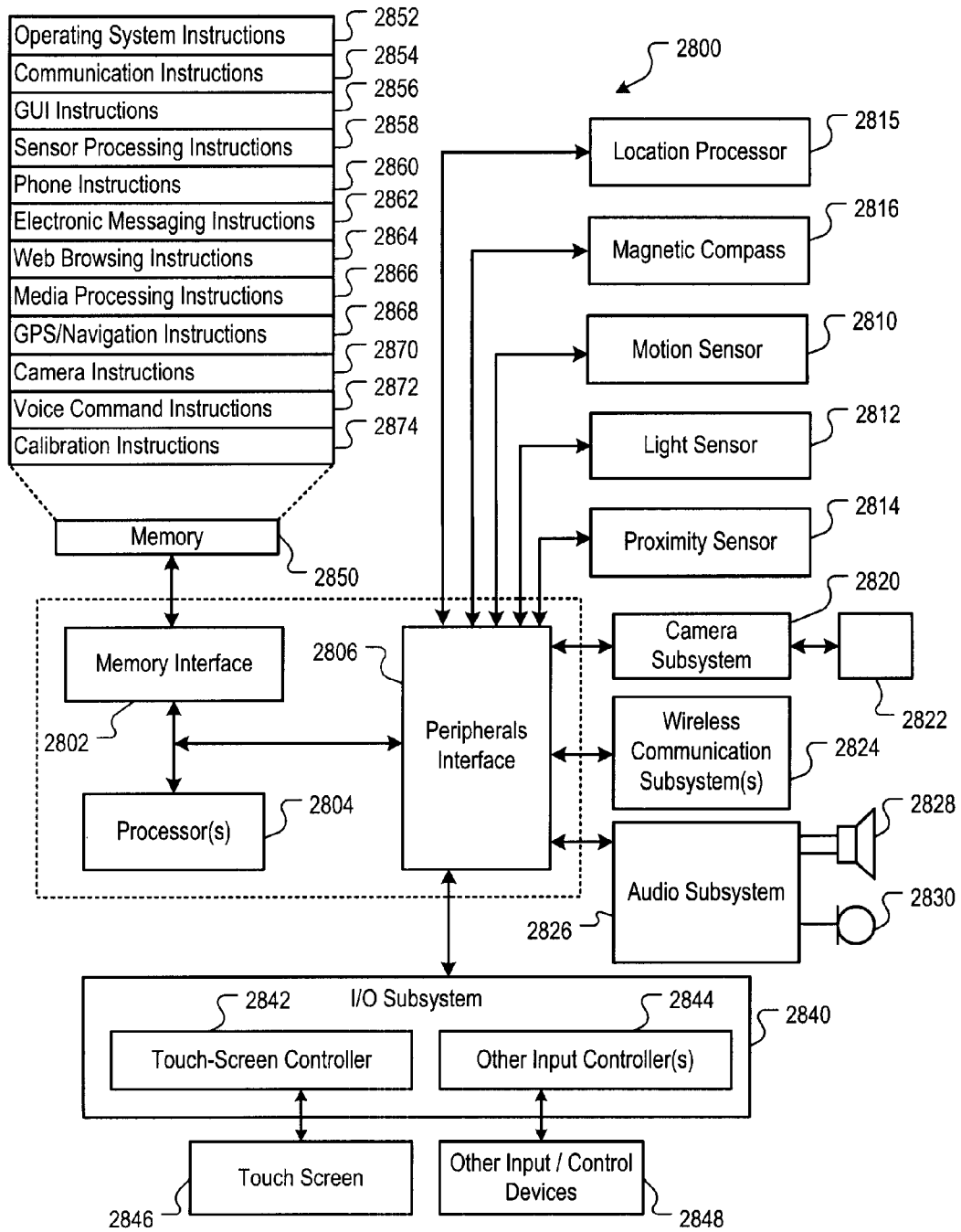
FIG. 28 is a block diagram of example architecture 2800 of a data processing device.

FIG. 28 is a block diagram of example architecture 2800 of a data processing device. The data processing devices 100 and 2702 can include a memory interface 2802, one or more data processors, image processors and/or central processing units 2804, and a peripherals interface 2806. The memory interface 2802, the one or more processors 2804 and/or the peripherals interface 2806 can be separate components or can be integrated in one or more integrated circuits. Various components in the data processing devices 100 and 2701 can be coupled together by one or more communication buses or signal lines.

Sensors, devices, and subsystems can be coupled to the peripherals interface 2806 to facilitate multiple functionalities. For example, a motion sensor 2810, a light sensor 2812, and a proximity sensor 2814 can be coupled to the peripherals interface 2806 to facilitate the orientation, lighting, and proximity functions. A location processor 2815 (e.g., GPS receiver) can be connected to the peripherals interface 2806 to provide geopositioning. A magnetic compass integrated circuit 2816 can also be connected to the peripherals interface 2806 to provide orientation (e.g., to determine the direction of due North).

A camera subsystem 2820 and an optical sensor 2822, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 2824, which can include radio frequency receivers and transmitters and/or optical (e.g., infrared) receivers and transmitters. The specific design and implementation of the communication subsystem 2824 can depend on the communication network(s) over which the data processing devices 100 and 2702 is intended to operate. For example, data processing devices 100 and 2702 and may include communication subsystems 2824 designed to operate over a GSM network, a GPRS network, an EDGE network, a Wi-Fi or WiMax network, and a Bluetooth™ network. In particular, the wireless communication subsystems 2824 may include hosting protocols such that the data processing devices 100 and 2702 may be configured as a base station for other wireless devices.

An audio subsystem 2826 can be coupled to a speaker 2828 and a microphone 2830 to facilitate voice-enabled functions, such as voice recognition, voice replication, digital recording, and telephony functions.

The I/O subsystem 2840 can include a touch screen controller 2842 and/or other input controller(s) 2844 as described with respect to FIGS. 27A and 27B. For example, the I/O subsystem 2840 can include a microphone (internal and/or external), a speaker and a voice command recognition engine. The I/O subsystem 2840 can receive voice commands and present audio outputs over full duplex communication. For example, transport technologies other than regular cellular voice communications, such as voice over IP, can be implemented.

Also, voice commands can be processed using a two-pass process. The on-device voice command module can process the received voice commands to perform a generalized recognition. Audio data of the received voice commands can be sent to a server to provide a more detailed and accurate processing. The server may be better equipped (e.g., using a faster and more powerful processor) to perform voice command recognition than a mobile device. To reduce bandwidth requirements and latency issues, the audio data may not be sent to the server in its entirety. For example, the on-device voice command module can process the voice commands to identify strings of numbers, but may not be able to identify the exact voice commands. Thus, the on-device voice command module may determine that the voice commands or utterance contain "some numbers." A larger surrounding segment of the audio data can be sent to the server, and the server can asynchronously return a much better idea of what was actually said in the voice commands. By using the server in such manner, the benefits of server processing can be obtained while reducing or minimizing the costs involved with the server processing.

The touch-screen controller 2842 can be coupled to a touch screen 2846. The touch screen 2846 and touch screen controller 2842 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 2846.

The other input controller(s) 2844 can be coupled to other input/control devices 2848, such as one or more buttons, rocker switches, thumb-wheel, infrared port, USB port, and/or a pointer device such as a stylus. The one or more buttons (not shown) can include an up/down button for volume control of the speaker 2828 and/or the microphone 2830.

In one implementation, a pressing of the button for a first duration may disengage a lock of the touch screen 2846; and a pressing of the button for a second duration that is longer than the first duration may turn power to the data processing devices 100 and 2702 on or off. The user may be able to customize a functionality of one or more of the buttons. The touch screen 2846 can, for example, also be used to implement virtual or soft buttons and/or a keyboard.

In some implementations, the data processing devices 100 and 2702 can present recorded audio and/or video files, such as MP3, AAC, and MPEG files. In some implementations, the data processing devices 100 and 2702 can include the functionality of an MP3 player, such as an iPod Touch™.

The memory interface 2802 can be coupled to memory 2850. The memory 2850 can include high-speed random access memory and/or non-volatile memory, such as one or more magnetic disk storage devices, one or more optical storage devices, and/or flash memory (e.g., NAND, NOR). The memory 2850 can store an operating system 2852, such as Darwin, RTXC, LINUX, UNIX, OS X, WINDOWS, or an embedded operating system such as VxWorks. The operating system 2852 may include instructions for handling basic system services and for performing hardware dependent tasks. In some implementations, the operating system 2852 can be a kernel (e.g., UNIX kernel).

The memory 2850 may also store communication instructions 2854 to facilitate communicating with one or more additional devices, one or more computers and/or one or more servers. The memory 2850 may include graphical user interface instructions 2856 to facilitate graphic user interface processing; sensor processing instructions 2858 to facilitate sensor-related processing and functions; phone instructions 2860 to facilitate phone-related processes and functions; electronic messaging instructions 2862 to facilitate electronic-messaging related processes and functions; web browsing instructions 2864 to facilitate web browsing-related processes and functions; media processing instructions 2866 to facilitate media processing-related processes and functions; GPS/Navigation instructions 2868 to facilitate GPS and navigation-related processes and instructions; camera instructions 2870 to facilitate camera-related processes and functions; and voice command instructions 2872 to facilitate operation of the data processing device 2702. In some implementations, the GUI instructions 2856 and/or the media processing instructions 2866 implement the features and operations described in reference to FIGS. 1A-26.

The memory 2850 may also store other software instructions (not shown), such as web video instructions to facilitate web video-related processes and functions; and/or web shopping instructions to facilitate web shopping-related processes and functions. In some implementations, the media processing instructions 2866 are divided into audio processing instructions and video processing instructions to facilitate audio processing-related processes and functions and video processing-related processes and functions, respectively. An activation record and International Mobile Equipment Identity (IMEI) 2874 or similar hardware identifier can also be stored in memory 2850.

Each of the above identified instructions and applications can correspond to a set of instructions for performing one or more functions described above. These instructions need not be implemented as separate software programs, procedures, or modules. The memory 2850 can include additional instructions or fewer instructions. Furthermore, various functions of the data processing devices 100 and 2701 may be implemented in hardware and/or in software, including in one or more signal processing and/or application specific integrated circuits.

The techniques for displaying multiple images so as to provide an appearance of a 3D effect as described in FIGS. 1A-26 may be implemented using one or more computer programs comprising computer executable code stored on a tangible computer readable medium and executing on the data processing device 2702. The computer readable medium may include a hard disk drive, a flash memory device, a random access memory device such as DRAM and SDRAM, removable storage medium such as CD-ROM and DVD-ROM, a tape, a floppy disk, a Compact Flash memory card, a secure digital (SD) memory card, or some other storage device. In some implementations, the computer executable code may include multiple portions or modules, with each portion designed to perform a specific function described in connection with FIGS. 22-27. In some implementations, the techniques may be implemented using hardware such as a microprocessor, a microcontroller, an embedded microcontroller with internal memory, or an erasable, programmable read only memory (EPROM) encoding computer executable instructions for performing the techniques described in connection with FIGS. 22-26. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems apparatus and techniques described here can be implemented on a data processing device having a display device (e.g., a CRT (cathode ray tube) or LCD (liquid crystal display) monitor) for displaying information to the user and a positional input device, such as a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Only a few implementations and examples are described and other implementations, enhancements and variations can be made based on what is described and illustrated in this application.

What is claimed is:

1. A method performed by software executing on a data processing device, the method comprising:
    receiving, at the data processing device, images to be displayed;
    associating, at the data processing device, a subset of the received images with display portions on a display area; and
    displaying, at the data processing device, the subset of the received images on the associated display portions to provide an appearance of a three-dimensional (3D) effect, wherein the displaying comprises:
        manipulating the associated display portions to mask at least one image from the subset with at least one other image from the subset; and
    wherein the 3D effect includes folding a displayed image to reveal a first received image or unfolding a second received image to display the second received image.

2. The method of claim 1, wherein the displaying the subset of the received images comprises:
    manipulating the associated display portions to move a given image from the subset from one display portion to another to reveal a previously undisplayed image from the subset.

3. A system comprising:
    an image analyzer to
        receive images from a user,
        organize the received images into groups, wherein each group comprises at least one image, and
        detect at least one image characteristic of each image in a given one of the groups;
    an image associating unit in communication with the image analyzer to
        identify a layout for displaying the images in the given group on a display area based on the detected at least one image characteristic, and
        arranging the images in the given group to fit the identified layout; and
    a display unit to display the arranged images in the given group using the identified layout to present an appearance of a three-dimensional (3D) effect;
    wherein the 3D effect includes folding a displayed image to reveal a first received image or unfolding a second received image to display the second received image.

4. The system of claim 3, wherein the at least one image characteristic comprises an aspect ratio of each image.

5. The system of claim 3, wherein the image analyzer is configured to detect at least one image characteristic of each image in another one of the groups;
    the image associating unit is configured to
        identify a layout for the other group;
        arrange the images in the other group to fit the layout identified for the other group; and
    the display unit is configured to display the arranged images in the other group using the layout identified for the other group.

6. The system of claim 3, wherein the image associating unit is further configured to identify a transition to be displayed between displaying the two groups, wherein the identified transition provides an appearance of a 3D effect.

7. The system of claim 6, wherein the identified transition comprises:
    manipulating the display area to replace the one group of images with the other group of images a portion at a time.

8. The system of claim 3, wherein the at least one image characteristic comprises a face.

9. The system of claim 8, wherein the at least one image characteristic further comprises a location of the face and a direction of the face.

10. A data processing device, comprising:
    a storage unit to store software for displaying multiple images;
    a processor in communication with the storage unit to execute the software for displaying multiple images; and
    a display unit in communication with the processor to display a first sequence of images on a display area based on the executed software, wherein the software comprises instructions to display the first sequence of images by manipulating at least one of the images in the first sequence, display a second sequence of images on the display area based on the executed software, wherein the software comprises instructions to display the second sequence of images by manipulating at least one of the images in the second sequence;

wherein the software comprises instructions to display a transition between displaying the first set of images to displaying the second set of images;

wherein displaying the first sequence of images provides an appearance of a three-dimensional effect (3D) on the display area, and displaying the second sequence of images provides an appearance of another 3D effect on the display area;

wherein displaying the first sequence of images comprises displaying a given image from the first sequence of images and moving at least a portion of the displayed given image to reveal an underlying image not yet displayed from the first sequence.

11. A data processing device, comprising:
a storage unit to store software for displaying multiple images;
a processor in communication with the storage unit to execute the software for displaying multiple images; and
a display unit in communication with the processor to
display a first sequence of images on a display area based on the executed software, wherein the software comprises instructions to display the first sequence of images by manipulating at least one of the images in the first sequence, display a second sequence of images on the display area based on the executed software, wherein the software comprises instructions to display the second sequence of images by manipulating at least one of the images in the second sequence;

wherein the software comprises instructions to display a transition between displaying the first set of images to displaying the second set of images;

wherein displaying the first sequence of images provides an appearance of a three-dimensional effect (3D) on the display area, and displaying the second sequence of images provides an appearance of another 3D effect on the display area;

wherein displaying the first sequence of images comprises displaying on the display area, a first image and a second image from the first sequence of images, and moving at least a portion of the displayed first image to mask at least a portion of the displayed second image.

12. A data processing device, comprising:
a storage unit to store software for displaying multiple images;
a processor in communication with the storage unit to execute the software for displaying multiple images; and
a display unit in communication with the processor to
display a first sequence of images on a display area based on the executed software, wherein the software comprises instructions to display the first sequence of images by manipulating at least one of the images in the first sequence, display a second sequence of images on the display area based on the executed software, wherein the software comprises instructions to display the second sequence of images by manipulating at least one of the images in the second sequence;

wherein the software comprises instructions to display a transition between displaying the first set of images to displaying the second set of images;

wherein displaying the first sequence of images provides an appearance of a three-dimensional effect (3D) on the display area, and displaying the second sequence of images provides an appearance of another 3D effect on the display area;

wherein the display unit is configured to move at least one of the images in the first sequence by performing at least one of:
folding at least one of the images in the first sequence horizontally or vertically to display an underlying image not yet displayed from the first sequence;
swinging at least one of the images in the first sequence from an edge of the at least one image; or
rotating at least one of the images in the first sequence from an edge of the at least one image to mask at least one other image in the first sequence.

13. A method performed by software executing on a data processing device, the method comprising:
dividing, at the data processing device, a display area into multiple arrangements of display portions, wherein a given arrangement is different from remaining arrangements;
displaying, at the data processing device, a sequence of images using a given one of the arrangements of display portions; and
transitioning, at the data processing device, from displaying the given sequence of images using the given one of the arrangements to displaying another sequence of images using a different arrangement, comprising:
replacing at least one image from the given sequence of images with at least one image from the other sequence of images, wherein the replacing comprises folding at least one image from the given sequence of images to display at least one underlying image from the other sequence of images;
wherein the displaying and transitioning provide an appearance of a three-dimensional (3D) effect.

14. A method performed by software executing on a data processing device, the method comprising:
dividing, at the data processing device, a display area into multiple arrangements of display portions, wherein a given arrangement is different from remaining arrangements;
displaying, at the data processing device, a sequence of images using a given one of the arrangements of display portions; and
transitioning, at the data processing device, from displaying the given sequence of images using the given one of the arrangements to displaying another sequence of images using a different arrangement, comprising:
replacing at least one image from the given sequence of images with at least one image from the other sequence of images, wherein the replacing comprises rotating at least one image from the given sequence with respect to an edge of the at least one image to mask at least one other image from the given sequence and display at least one underlying image from the other sequence of images;
wherein the displaying and transitioning provide an appearance of a three-dimensional (3D) effect.

15. A method performed by software executing on a data processing device, the method comprising:
identifying, at the data processing device, images to be displayed;

dividing, at the data processing device, a two-dimensional (2D) display area into display portions;

displaying, at the data processing device, a sequence of the identified images on the display portions so as to provide an appearance of a three-dimensional (3D) effect;

flipping a first identified image along an edge of the first identified image to reveal an underlying identified image, wherein flipping provides an appearance of a 3D effect; and oscillating at least a portion of the flipped image to enhance the appearance of the 3D effect of flipping.

16. A method performed by software executing on a data processing device, the method comprising:

identifying, at the data processing device, images to be displayed;

dividing, at the data processing device, a two-dimensional (2D) display area into display portions;

displaying, at the data processing device, a sequence of the identified images on the display portions so as to provide an appearance of a three-dimensional (3D) effect;

flipping a first identified image along an edge of the first identified image to reveal an underlying identified image, wherein flipping provides an appearance of a 3D effect; and flipping a second identified image along an edge of the second identified image to mask an identified image, wherein flipping provides an appearance of a 3D effect.

* * * * *